US010187482B2

(12) United States Patent
Miller et al.

(10) Patent No.: US 10,187,482 B2
(45) Date of Patent: Jan. 22, 2019

(54) SYSTEMS AND METHODS FOR MATCHING ONLINE USERS ACROSS DEVICES

(71) Applicant: AOL Advertising Inc., New York, NY (US)

(72) Inventors: Nicholas P. Miller, London (GB); Simon D. Edwards, London (GB); Alan J. Milford, Hants (GB); Denys P. Kim, Fairfax, VA (US); Bart W. R. Schelfhout, London (GB)

(73) Assignee: OATH (AMERICAS) INC., New York, NY (US)

( * ) Notice: Subject to any disclaimer, the term of this patent is extended or adjusted under 35 U.S.C. 154(b) by 234 days.

(21) Appl. No.: 14/283,843

(22) Filed: May 21, 2014

(65) Prior Publication Data

US 2015/0341453 A1 Nov. 26, 2015

(51) Int. Cl.
*H04W 4/21* (2018.01)
*H04L 29/08* (2006.01)

(52) U.S. Cl.
CPC ............... *H04L 67/22* (2013.01); *H04W 4/21* (2018.02)

(58) Field of Classification Search
None
See application file for complete search history.

(56) References Cited

U.S. PATENT DOCUMENTS

| 8,042,164 | B2 * | 10/2011 | Sheynblat | G06Q 30/0217 705/14.19 |
| 8,620,942 | B1 * | 12/2013 | Hoffman | G06Q 10/107 707/766 |
| 8,661,119 | B1 * | 2/2014 | Jindal | H04L 67/02 709/224 |
| 8,880,097 | B1 * | 11/2014 | Xu | H04W 4/029 455/456.1 |
| 2007/0124288 | A1 * | 5/2007 | Swanson | G06F 17/30864 |
| 2010/0228625 | A1 * | 9/2010 | Priyadarshan | G06Q 30/02 705/14.49 |
| 2012/0036261 | A1 | 2/2012 | Salazar et al. | |
| 2012/0324060 | A1 | 12/2012 | Afergan et al. | |
| 2013/0124309 | A1 | 5/2013 | Traasdahl et al. | |

(Continued)

OTHER PUBLICATIONS

International Search Report dated Jun. 16, 2015 in International Appl. No. PCT/US 14/60487 (2 pgs).

*Primary Examiner* — Sargon N Nano
*Assistant Examiner* — Christopher B Robinson
(74) *Attorney, Agent, or Firm* — Bookoff McAndrews, PLLC

(57) ABSTRACT

Systems and methods are disclosed for associating a plurality of Internet-enabled devices with a common user profile for targeting Internet content or advertising. One method includes: receiving, from a plurality of Internet-enabled devices, a plurality of requests for electronic content or advertising; extracting, from each of the plurality of requests, a source IP address and a unique identifier associated with the respective Internet-enabled device; for each source IP address for which requests were received over a predetermined time period from a number of Internet-enabled devices below a threshold number of devices, identifying each possible pair of devices from which requests were received; and for each possible pair of devices, calculating a probability that the pair of devices are owned or operated by a common user.

17 Claims, 9 Drawing Sheets

(56) References Cited

U.S. PATENT DOCUMENTS

| | | | |
|---|---|---|---|
| 2013/0124315 A1* | 5/2013 | Doughty | G06Q 30/0269 705/14.53 |
| 2013/0217330 A1 | 8/2013 | Gardenfors et al. | |
| 2015/0073863 A1* | 3/2015 | Malgatti | G06Q 30/0201 705/7.29 |
| 2015/0248706 A1* | 9/2015 | Mi | G06Q 30/0269 705/14.53 |

* cited by examiner

SYSTEMS AND METHODS FOR MATCHING ONLINE USERS ACROSS DEVICES

TECHNICAL FIELD

Various embodiments of the present disclosure relate generally to online user identity management and to delivering Internet content and advertising. More specifically, exemplary embodiments of the present disclosure relate to systems and methods for identifying users as they use various devices to access the Internet (e.g., by matching devices and browsers to common users), and to online advertising based on users' identities for targeted and behavioral advertising.

BACKGROUND

In recent years, people have started spending more and more time browsing content on the Internet, as opposed to traditional sources, such as television, radio, and print media. As a result, the value of advertising on web pages has risen significantly, and techniques for targeting demographics of interest have become very advanced.

Internet cookies have become a ubiquitous and invaluable tool for performing Internet advertising and other important online functions. Traditional techniques for targeting electronic advertising involve configuring users' Internet browsers such that third party cookies can be set, read from, and written to. When a cookie is set on a browser, one of the identifying elements of the cookie is the domain from which it was served. If an Internet user visits, for example, www.site.com and that site contains code to set a cookie, then that cookie will be set with "site.com" as its domain. Continuing this illustrative example, site.com can also embed code that pulls content, such as ads, from URLs that are not on the site.com domain and those ads can also set cookies. For example, site.com can have code on its page that pulls an ad from, by way of example, www.adnetwork.com. The ad will be served from adnetwork.com and will set cookies on the adnetwork.com domain.

Online advertising may be significantly enhanced by web browsers that, by default or by settings, allow third party cookies, and by people who permit visited sites to set and read third party cookies. Use of third party cookies enables ad networks to access cookies that they set across a wide network of websites, thereby enabling behavioral and contextual advertising to web viewers across many visited websites. Specifically, web browsers that are set to allow third party cookies will allow, for example, adnetwork.com to set its cookie despite the user having visited www.site.com. Furthermore, the same browser setting will also allow adnetwork.com to access any cookies set under their domain regardless of which site the Internet user is visiting.

By way of background, ad networks typically have hundreds or thousands of partners (often referred to as "publishers") that publish online content along with "ad tags" provided by their partner ad network. For example, each of a news website (www.news.com), a blog (www.blog.com), and an informational website (www.info.com), among others, may engage an ad network to efficiently and profitably advertise to those websites' viewers. The ad network provides each of those sites with an ad tag having the ad network's domain, e.g., "adnetwork.com." For any visitors, or more specifically, visitors' browsers that allow third party cookies, the ad network may access cookie data of visitors to its partners' sites (i.e., across its entire network of sites), even though those sites' domains (e.g., www.news.com, etc.) do not match the ad network's domain. Specifically, the ad network's ad tag on each site may access cookie data associated with the domain of the ad tag. As a result, the ad network may learn more about a user's browsing history across its network, and therefore more about the user's likely demographics, interests, purchasing goals, and other useful advertising information.

Each time an Internet advertisement is shown to a website visitor is known as an "impression." When the user is shown the advertisement, the user may select, or "click," on the advertisement, or may take another "action," such as completing an online form to request more information. If the user later purchases the product, the purchase is referred to as a "conversion" of the impression. Advertisers may be interested in impressions (e.g., if they are trying to increase awareness of a brand), clicks (e.g., if they are trying to provide more information about a product), or conversions (e.g., if they are trying to make sales or get new users to sign up for services). Advertisers may pay advertising networks and therefore publishers based on, for example, impressions, clicks, or conversions over the course of an advertising campaign. Typically, an advertiser may have a spending plan that specifies how the advertiser wishes to spend its budget during a campaign.

Advertising networks rely on being able to accurately identify the person viewing an advertising creative in order to tailor the advertising creative to the user's specific interests, provide frequency capping, and provide other user specific functionality. In the world of behavioral advertising, the user's identity is often tied to a user profile (targeting profile) containing information about their demographics, interests, and programmatically determined properties (such as look-a-like segmentation). This allows the advertising creative to be highly targeted to the specific user, providing more relevant offers and opportunities and as a result improving click through and conversion rates.

Even though cookies enable advanced targeting and advertising to users whose browsers enable third party cookies, these technologies are unable to leverage browsing history, behavioral and contextual information, and other intelligence relating to a user when it is divided among multiple devices or browsers. Specifically, most modern users of the Internet often use more than one device to access the Internet over the course of a single day, such as, for example, a PC at home, a laptop at work, and one or more tablets and/or mobile devices throughout the day, whether employer-provided or personal. Because of the standards associated with existing cookies and browsers, the advantageous user IDs, browsing history, demographic data, etc., can only be stored in relation to a cookie stored for a particular browser on a particular device. Recent trends in mobile and tablet technology has meant that users are more frequently utilizing multiple devices to access the Internet and as a result see ads across many different devices or screens. Because online advertisers are interested in improved targeting to their intended audience, ad networks also have a strong interest in providing targeting to users across their various browsers and devices. Thus, the traditional method of identifying a user and tying a targeting to profile to a user's device has significant disadvantages, since the profile is effectively tied to a device and not to the real target: the user. Furthermore, many mobile devices do not permit third party cookies to be stored on the device, rendering the identification of the user via this method challenging. User targeting has been limited to device level targeting, instead of offering a more holistic view of a user's behavior online.

Accordingly, a need exists for systems and methods for improved online user and device ID management, and delivery of Internet advertising and content to devices matched to common users. More specifically, a need exists for systems and methods for matching users across various Internet-enabled devices, and to online advertising based on users' identities for targeted and behavioral advertising.

SUMMARY OF THE DISCLOSURE

According to certain embodiments, methods are disclosed for associating a plurality of Internet-enabled devices with a common user profile for targeting Internet content or advertising. One method includes receiving, from a plurality of Internet-enabled devices, a plurality of requests for electronic content or advertising; extracting, from each of the plurality of requests, a source IP address and a unique identifier associated with the respective Internet-enabled device; for each source IP address for which requests were received over a predetermined time period from a number of Internet-enabled devices below a threshold number of devices, identifying each possible pair of devices from which requests were received; and for each possible pair of devices, calculating a probability that the pair of devices are owned or operated by a common user.

According to certain embodiments, systems are disclosed for associating a plurality of Internet-enabled devices with a common user profile for targeting Internet content or advertising. One system includes a data storage device storing instructions for associating a plurality of Internet-enabled devices with a common user profile for targeting Internet content or advertising; and a processor configured to execute the instructions to perform a method including: receiving, from a plurality of Internet-enabled devices, a plurality of requests for electronic content or advertising; extracting, from each of the plurality of requests, a source IP address and a unique identifier associated with the respective Internet-enabled device; for each source IP address for which requests were received over a predetermined time period from a number of Internet-enabled devices below a threshold number of devices, identifying each possible pair of devices from which requests were received; and for each possible pair of devices, calculating a probability that the pair of devices are owned or operated by a common user.

According to certain embodiments, a non-tangible computer-readable medium is disclosed storing instructions that, when executed by a processor, cause the processor to perform a method for associating a plurality of Internet-enabled devices with a common user profile for targeting Internet content or advertising, the method including: receiving, from a plurality of Internet-enabled devices, a plurality of requests for electronic content or advertising; extracting, from each of the plurality of requests, a source IP address and a unique identifier associated with the respective Internet-enabled device; for each source IP address for which requests were received over a predetermined time period from a number of Internet-enabled devices below a threshold number of devices, identifying each possible pair of devices from which requests were received; and for each possible pair of devices, calculating a probability that the pair of devices are owned or operated by a common user.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

Figure 1:
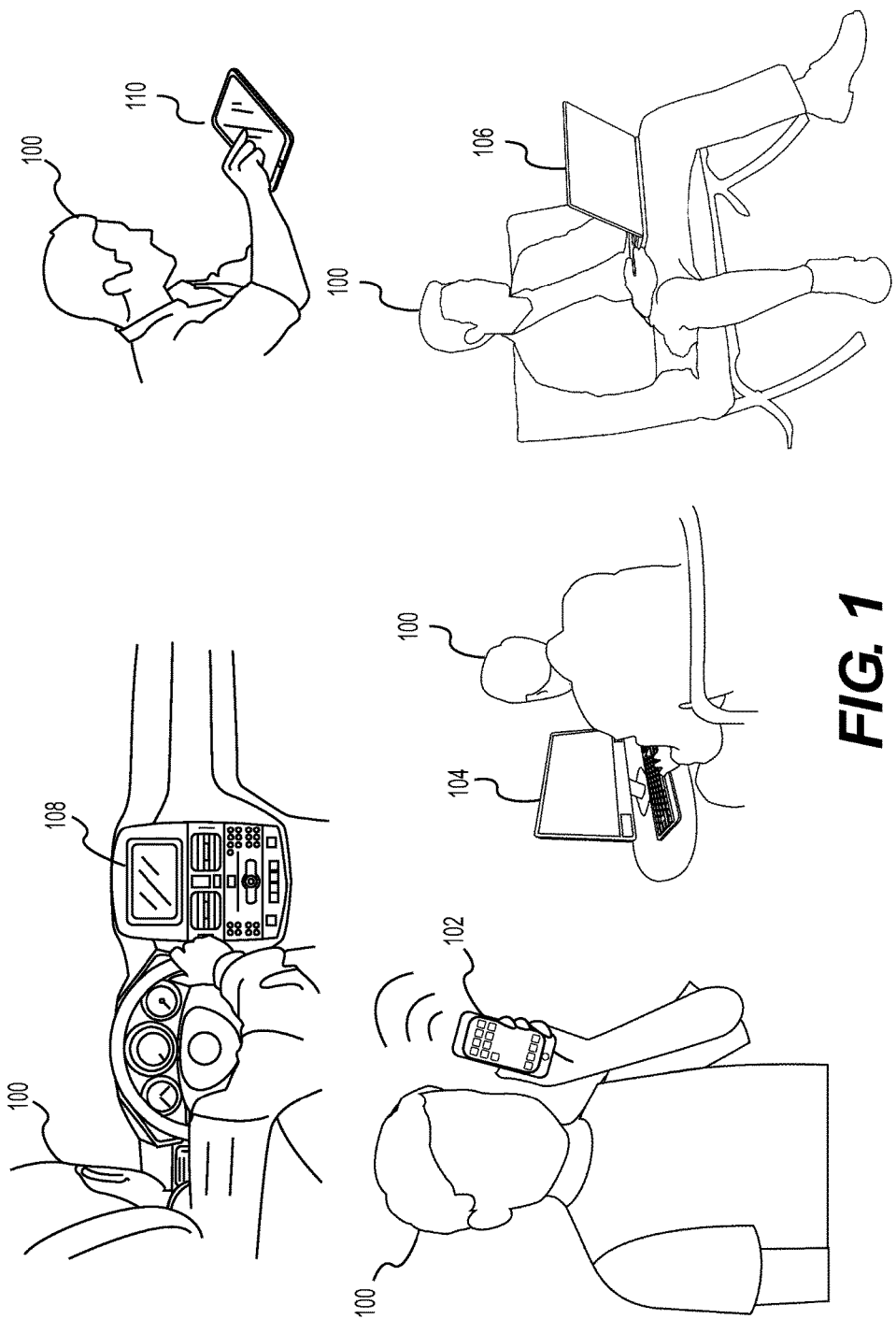
FIG. 1 is a series of schematic diagrams depicting exemplary environments in which users may use disclosed devices and methods according to an exemplary embodiment of the present disclosure.

Reference will now be made in detail to the exemplary embodiments of the disclosure, examples of which are illustrated in the accompanying drawings. Wherever possible, the same reference numbers will be used throughout the drawings to refer to the same or like parts.

As described above, prior Internet advertising technologies involved cookies that stored advertising identifiers that are local or specific to a single machine/device or browser. The present disclosure describes systems and methods for linking a user's identity across the user's devices to generate and leverage additional opportunities to reach the user with targeted advertising, and assemble fuller, more accurate behavioral profile of a user through the observation of larger slices of the users online activities. For example, the present disclosure describes a platform configured to link together individual unique targeting identities to create a holistic profile of a user's activity and behavior across multiple devices, and make that profile available to other systems for the purposes of delivering targeted advertising and content, and for the purposes of research and analysis.

Various aspects of the present disclosure are related to pluggable algorithms that create statistical links between unique devices or browsers, for example a user's desktop and their mobile phone, multiple web browsers on the same device, multiple mobile devices. The resulting linkage allows content and advertising to be displayed on one device, using information collected about the user on the others. This permits a more complete view of the user to be generated regardless of which device they are using to access the internet.

When a user visits a web page or uses a mobile app, data is collected via ad calls and embedded pixel calls. These ad calls and embedded pixel calls may collect information about the user (including some kind of identifier, such as the value of a cookie or a device identifier) and pass it back to a server. Each web page visit, click, or other unit of activity may be considered an "event," and messages generated for these events may be streamed into a software application, which consists of multiple tiers of filtering, sorting, aggregating, and the application of statistical algorithms. In certain embodiments, every step of the disclosed methods may implement specific logic to an inbound "event," transforming or enriching the data before passing it onto the next step. At certain steps the events may be aggregated together into increasingly large time blocks allowing multiple events to be evaluated at the same time. Further analysis may be performed on the aggregated results through the application of deterministic and probabilistic algorithms. The data may stream through the application and the results may be pushed out in real time. In addition, events may be captured and persisted to storage to permit batch or offline processing and analysis to be conducted. The application supports multiple routes through the available processing steps, or algorithms, the exact pathway being determined by the data contained within the event. The processing algorithms can be dynamically configured and could be described as pluggable, allowing new algorithms to be added to the system and existing algorithms to be configured dynamically.

More specifically, the present disclosure is directed to linking together or matching all of the devices and/or browsers that belong to a specific user. The term "devices" as used herein should be construed to cover both actual physical devices, such as mobile phones, tablets, and desktop or laptop computers, as well as different browser instances that may exist on the same physical piece of hardware. Each step in the disclosed processing algorithms may evaluate the likelihood that two devices belong to the same user, by looking at properties, such as what IP address the request originates from, the location of the IP address, the time of day and day of the week the event occurred on, any authentication data that is available, any third party identifiers that have been made available, such as social network user identifiers, the type of device and browser being used, any information already known about the device or user (such as targeting segments), the request headers and other information that can be added to the event message by up-stream applications. Once a link is established between two devices, the link may be persisted and made available to other systems, such as ad servers and content targeting applications, which can use the links to understand a user across multiple screens, ensuring the best content and advertising is targeted to the user.

According to certain embodiments, the present disclosure may involve monitoring a unique identifier for a device or browser (e.g., obtained using a cookie), observing how it appears on different IP addresses over time, and comparing this to how other unique identifiers appear on different IP addresses over time. The present disclosure may also involve identifying pairs of identifiers that have a similar pattern (e.g., if they appear on the same non-public IP address a threshold number of times per day, for a certain percentage of the preceding X days), and thus establishing a link or relationship between the two device/browser identifiers, and also any logical distinction between devices. The disclosed techniques may involve weighting the relationship between two devices or browsers by looking at the time of day these devices appear on an IP address, giving greater weight to those times of day when a user is most likely to be on their home network rather than on a public network or accessing the internet from work.

The present disclosure may involve further validating this relationship by looking at pre-existing data known about the devices/browsers and looking for similarities between the two, allowing the link to be confirmed or rejected. This pre-existing data can be behavioral targeting segments, demographic data, or geographic data. In one embodiment, the disclosed embodiments may include using first party authentication data to create concrete links between two devices. The disclosed embodiments may further include using authentication data collected from email service authentication (IMAP) associated with an IP address to compare with first party authentication data to create links between multiple devices/browsers.

The disclosed embodiments may further include generating multiple pairs of linked devices and grouping these together to create a complete picture of a user across all the devices they use to access the internet. The disclosed embodiments may further include grouping users together into households, allowing household level targeting. The disclosed embodiments may further include grouping larger sets of users together by some property, such as public network, to allow targeting of organizations (such as universities), specific locations (e.g., public places, such as coffee shops, shopping centers, public transport infrastructure, etc.). Moreover, the disclosed embodiments may further include undertaking one or more components of the above-described analysis in real-time, such as by streaming events through a multi-tier processing application, aggregating, sorting, and filtering data to produce the final result (e.g., event driven architecture) and immediately making this analyzed data available to external systems.

Turning now to the figures, FIG. 1 is a schematic diagram of a series of environments in which users may access Internet content and advertising, according to exemplary embodiments of the present disclosure. Specifically, FIG. 1 depicts how the same user 100 may access the Internet using any number or type of Internet-enabled devices, such as, for example, a mobile device 102 (e.g., smartphone, PDA, etc.), a work computer 104 (e.g., such as a PC, Windows, Mac, etc., whether desktop or laptop), a home computer 106 (e.g., a PC or Mac laptop or desktop), an automobile computer 108 (e.g., whether OEM or after-market), a tablet 110, or any other type of kiosk, computer, or mobile device connected to the Internet through a wired or wireless connection. For example, a typical user might wake up in the morning and check the weather and his or her e-mail on his or her smartphone 102. The user may then drive to work and access Internet content, such as traffic or news, through his or her automobile computer 108. The user may then operate a computer 104 upon arriving at his or her workplace, including to access Internet content, whether related to work activities and/or personal activities. The user may then return home in the evening and use one or more of a home computer 106 and a tablet 110. Of course, the preceding scenario is only exemplary in nature, and users' Internet habits may vary widely in terms of which devices they use at given locations and times. For example, many users may use a tablet 110 only at work or only at home, while other users may use a tablet 110 while at home and at work, and for both personal and professional activities. Likewise, some users may use a mobile device 102 to access both personal and professional Internet content and e-mail throughout the day, even while also using a work computer 104. Also, a user may use a home computer 106 at non-traditional times of the day, and may use the home computer 106 to perform professional activities, whether during the day or evening.

Figure 2:
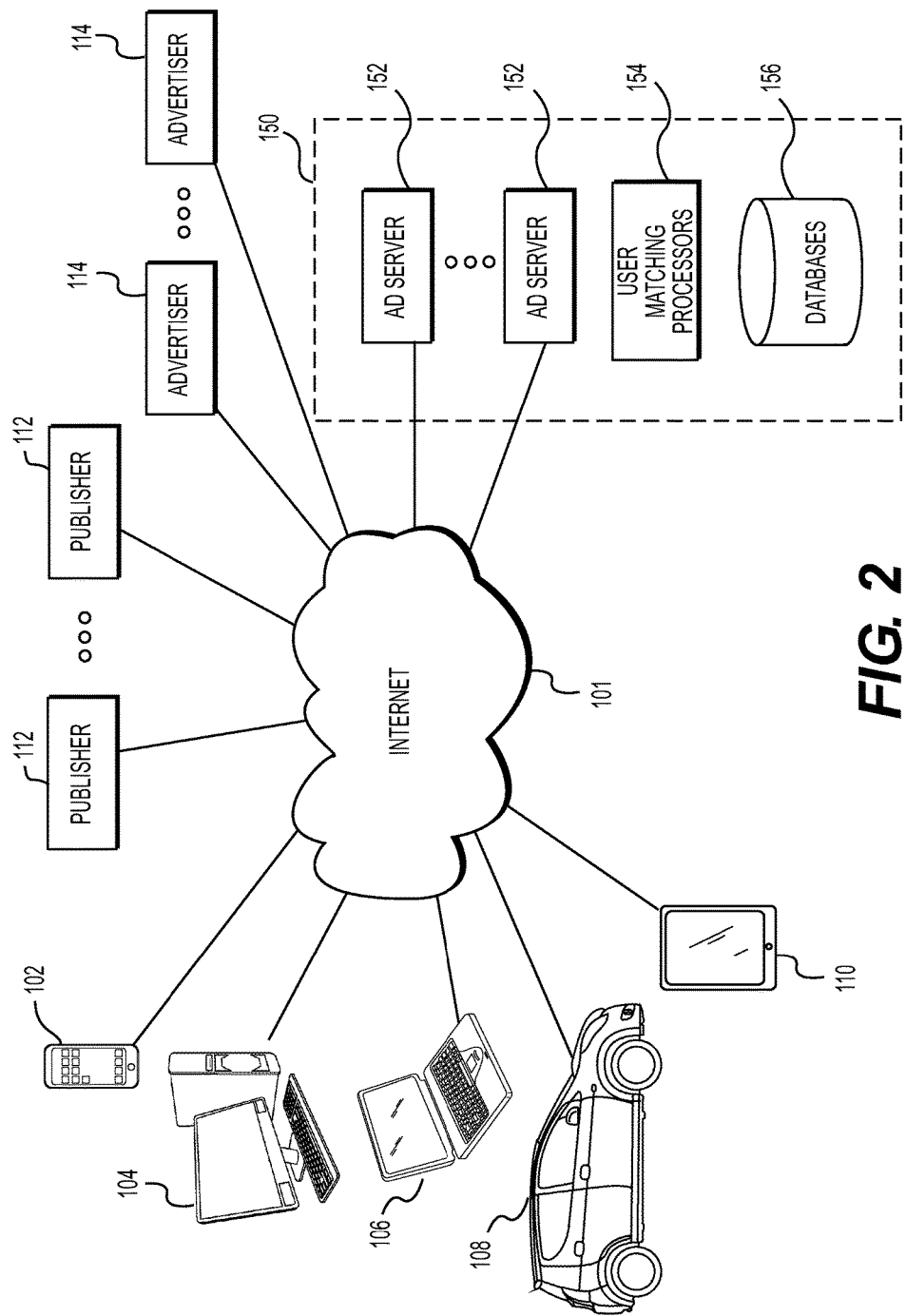
FIG. 2 is a schematic diagram of an exemplary environment and system for matching users and/or user advertising IDs across devices and browsers, according to an exemplary embodiment of the present disclosure.

FIG. 2 illustrates an exemplary environment in which users may access the Internet using multiple devices, including a plurality of user devices 102-110. FIG. 2 also illustrates an exemplary system for matching users and/or user advertising IDs across devices and browsers, the system including one or more of: publisher servers 112, advertiser servers 114, and user matching server systems 150, all disposed in communication with the Internet 101. In one embodiment, publisher servers 112 and advertiser servers 114 may be owned and operated by publishing and advertising entities, respectively, and not be strictly part of the same system as user matching server systems 150.

In one embodiment, user devices 102-110 may be owned and used by one or more people, who may be viewers of web pages over the Internet, either through a mobile browser or web browser stored on respective user devices. As described above, user devices 102-110 may include any type of electronic device configured to send and receive data, such as websites and electronic advertisements, over the Internet. For example, each of user devices 102-110 may include a server, personal computer, tablet computer, mobile device, smartphone, and/or personal digital assistant ("PDA") disposed in communication with the Internet. Each of user devices 102-110 may have a web browser or mobile browser installed for receiving and displaying web and/or ad content from web servers. Thus, each of user devices 102-110 may be configured to receive and display data that is received from one or more of publisher servers 112, advertiser servers 114, and user matching server systems 150, among any other web servers, domain name system ("DNS") servers, content distribution network ("CDN") servers, etc., over the Internet. As described above, in one embodiment, a user may own and, simultaneously or intermittently, use one or more of user devices 102-110, whether of similar or different type.

Publisher web servers 112 may be owned and/or operated by any entities having inventories of available online advertising space. For example, publishers may include online content providers, search engines, e-mail programs, or any other online site or program having online user traffic. Publishers may interact with user devices 102-110, adver-tiser servers 114, and user matching server systems 150, through publisher servers 112 connected to the Internet. Thus, publishers may be able to communicate inventory information, such as site information, demographic information, cost information, etc., to other entities in the environment of FIG. 2.

Advertiser servers 114 may be owned and/or operated by any entities having content, such as online advertisements (e.g., display ads, banner ads, pop-ups, etc.) desired to be delivered to online users. Advertisers may interact with user devices 102-110, publisher servers 112, and/or user matching server systems 150, through advertiser servers 114 connected to the Internet 101. Thus, advertisers may be able to communicate advertising information, such as ad information, targeting information, consumer information, budget information, bidding information, etc., to other entities in the environment of FIG. 2.

User matching server systems 150 may be configured to interact with one or more of user devices 102-110, publisher servers 112, and advertiser servers 114 over the Internet 101 to perform any of the presently disclosed techniques and methods. In one embodiment, user matching server systems 150 may include one or more of: a plurality of ad servers 152, user matching processor(s) 154, and database(s) 156. Of course, it should be appreciated that ad servers 152 may be operated by an operator only contractually or even loosely affiliated with an operator of user matching processor 154. Alternatively, the ad servers 152 and user matching processor 154 may be operated by the same advertising entity or online entity.

Ad servers 152 may include any type of servers configured to process advertising information from advertisers and/or site information from publishers, and send and receive ad requests and information from user devices 102-110, either directly or indirectly. In one embodiment, ad servers 152 may be owned and operated by an ad network, which may be a business that receives ad buys from advertisers, and serves ads on inventory supplied by publishers. Thus, an ad network operating ad servers 152 may receive revenue from advertisers, purchase impressions from publishers, and serve ads on publishers' web pages when viewers associated with user devices 102-110 view those web pages. According to aspects of the present disclosure, ad servers 152 may be configured to interact with user matching processor 154, such as through one or more APIs associated with user matching processor 154, to obtain one or more of: unique user IDs, cookie data, browsing history, demographic data, user profile data, etc., in response to interaction from user devices 102-110.

In certain embodiments, ad servers 152 may be remote web servers that receive advertising information from advertisers and serve ads to be placed by publishers. Ad servers 152 may be configured to serve ads across various domains of publishers, for example, based on advertising information provided by advertisers. Ad servers 152 may also be configured to serve ads based on contextual targeting of web sites, search results, and/or user profile information. In some embodiments, ad servers 152 may be configured to serve ads based on ad tags served by advertiser servers 114 and/or publisher servers 112, and on ad requests received from user devices 102-110. Ad servers 152 may be configured to send and receive data from user devices 102-110, publisher servers 112, advertiser servers 114, and/or user matching processor 154, over the Internet.

Ad servers 152 and user matching processor 154, either alone or in combination, may include any type or combination of computing systems, such as clustered computing machines and/or servers. In one embodiment, each of ad servers 152 and user matching processor 154 may be an assembly of hardware, including a memory, a central processing unit ("CPU"), and/or a user interface. The memory may include any type of RAM or ROM embodied in a physical storage medium, such as magnetic storage including floppy disk, hard disk, or magnetic tape; semiconductor storage such as solid state disk (SSD) or flash memory; optical disc storage; or magneto-optical disc storage. The CPU may include one or more processors for processing data according to instructions stored in the memory. The functions of the processor may be provided by a single dedicated processor or by a plurality of processors. Moreover, the processor may include, without limitation, digital signal processor (DSP) hardware, or any other hardware capable of executing software. The user interface may include any type or combination of input/output devices, such as a display monitor, touchpad, touchscreen, microphone, camera, keyboard, and/or mouse.

Regardless of specific physical components or layout, one or more of ad servers 152 and user matching processor 154, or any other servers or systems associated with ad network involving ad servers 152 and user matching processor 154, may be programmed with instructions to perform a method of user matching user advertising IDs across devices and browsers, and performing online targeted and behavioral advertising across user devices, according to the exemplary disclosed methods, such as the exemplary methods described with respect to FIGS. 3-6 below.

Figure 3:
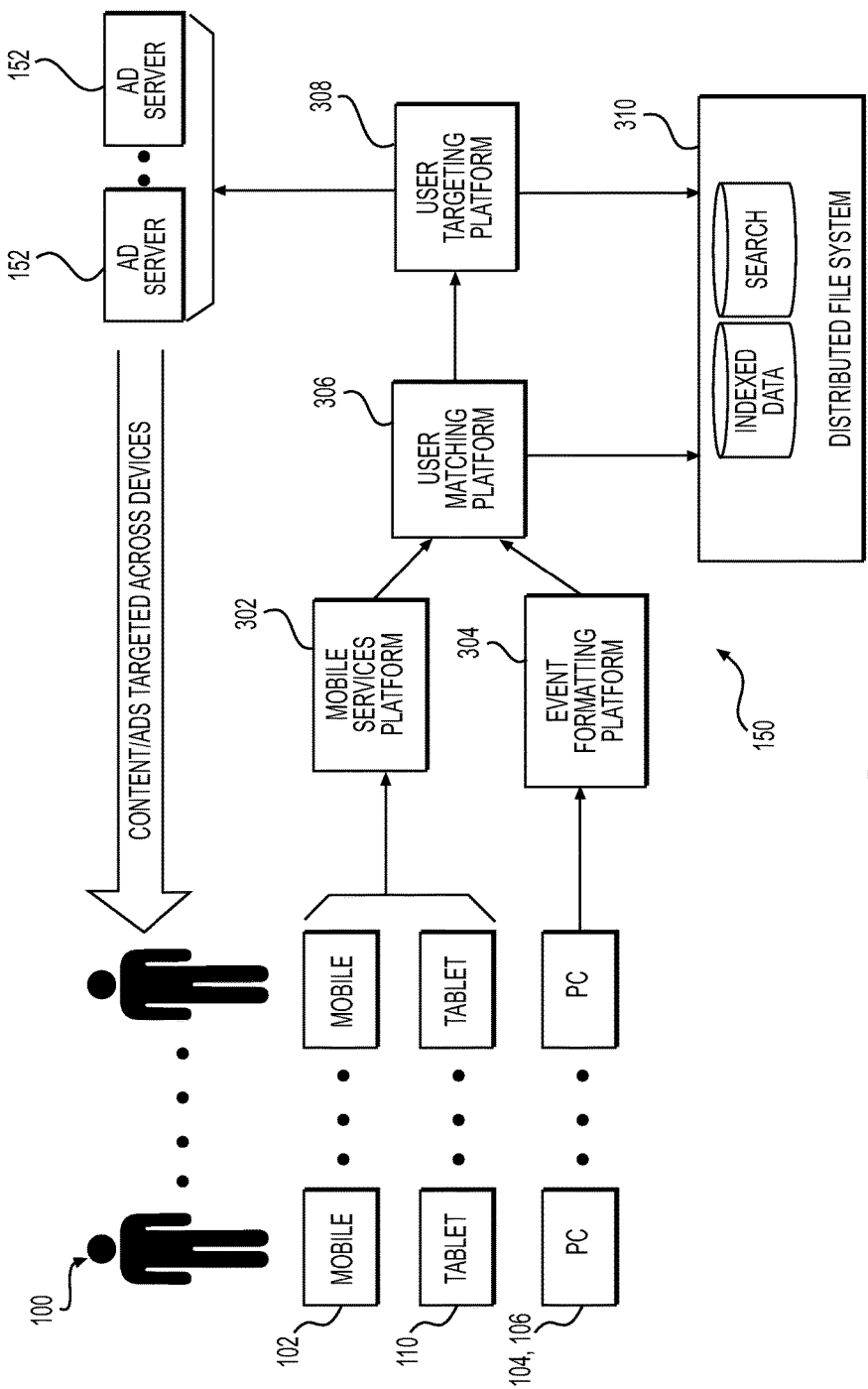
FIG. 3 is a flow diagram of an exemplary environment, systems, and data flow for matching users and/or user advertising IDs across devices and browsers, according to an exemplary embodiment of the present disclosure.

FIG. 3 is a schematic diagram of the flow of information between users and components of user matching server systems 150 for matching users and/or user advertising IDs across devices and browsers, and for performing online targeted and behavioral advertising across user devices, according to an exemplary embodiment of the present disclosure. Specifically, according to embodiments of the present disclosure, user devices 102-110, publisher servers 112, advertiser servers 114, and ad servers 152, may exchange data with one or more of user matching processor 154 and databases 156 of user matching server systems 150 (all through one or more computers and/or servers connected to the Internet 101, as described with respect to FIG. 2).

Specifically, FIG. 3 depicts an exemplary embodiment of user matching server system 150, operating a plurality of platforms for receiving online event data from users, e.g., over the Internet, for matching users across devices for performing delivery of targeted content and advertising. As shown in FIG. 3, in one embodiment, user matching server system 150 may include a mobile services platform 302 and an event formatting platform 304. In one embodiment, mobile services platform 302 may receive online event data from users based on the users' interaction with any of the users' mobile devices, such as mobile devices 102 and/or tablet devices 110. The event formatting platform 304 may receive online event data from users based on the users' interaction with any of the users' non-mobile devices, such as laptop and/or desktop PCs 104, 106. User matching server system 150 may further include a user matching platform 306 disposed in communication with a user targeting platform 308. The user matching platform 306 and user targeting platform 308 may each be disposed in communication with one or more components of a distributed file system for storing, indexing, and parsing through large quantities of data, such as distributed file system 310. In addition, the user targeting platform 308 may be disposed in communication with one or more ad servers 152, which may be configured to identify and serve advertisements based on targeting rules set by the user targeting platform 308 for devices matched to users by user matching platform 306. Any or all of the components of FIG. 3 may be incorporated into or disposed in communication with the ad servers 152, user matching processors 154, and/or database devices 156 described above with respect to user matching server system 150 of FIG. 2. Moreover, any component or subsystem of the platforms of FIG. 3 may be outsourced and/or contracted out to an entity distinct from or in association with an operator of ad servers 152, publishers 112, and/or advertisers 114. The structures, configurations, and operations of mobile services platform 302, event formatting platform 304, and user matching platform 306 will now be described in greater detail.

As described above, the present disclosure is directed to identifying links between Internet-connected user devices to determine devices that are likely owned and/or used by a common individual. Accordingly, user matching server system 150 may be configured to collect information about online activity that users 100 engage in, and online events, such as requests, transmissions, downloads, ad calls, clicks, mouse-overs, purchases, etc. that users make using their various Internet-connected devices 102-110. In one embodiment, mobile services platform 302 may be configured for receiving and handling advertising requests from native apps and web browsers of mobile phone and tablet devices, such as by constructing a message for each inbound request and forwarding each constructed message to a queue for consumption by user matching platform 306. When events or requests are generated by a mobile web browser, the user may have requested a web page via the mobile web browser, which includes code that makes a request for an advertisement. The request for the advertisement may be routed either to the mobile services platform 302 (which determines which ad serving platform the request should be routed to) or routed directly to an ad server 152 to process the request. In either case, the destination ad server 152 may respond by delivering an advertising creative and logging certain data about the request. When mobile services platform 302 is involved in the routing, mobile services platform 302 may collect certain data about the request, and present this message to user matching platform 306 via the message queue. If the events or requests are generated by a mobile application, then the ad requests may be sent directly to mobile services platform 302 in lieu of ad servers 152.

Event formatting platform 304 may be configured to receive data about events from PC (e.g., desktop or laptop) clients, and to construct a suitable message for each event (e.g., ad call, site visit, click, mouse-over, etc.) for forwarding to user matching platform 306. In one embodiment, event formatting platform 304 may be implemented as a real time exchange (or "RTX") integration system that collects pixel tracking events received from user devices 104, 106, and forwards messages about those PC events to an Active MQ cluster for consumption by the user matching platform 306. For example, the Active MQ cluster may be configured to receive constructed, formatted messages from both the mobile services platform 302 and event formatting platform 304, for consistent delivery to the user matching platform 306. It should be appreciated that a PC-based ad request may originate from a web browser or from any other type of software, such as a client application for exchanging messages and/or multimedia.

Figure 4:
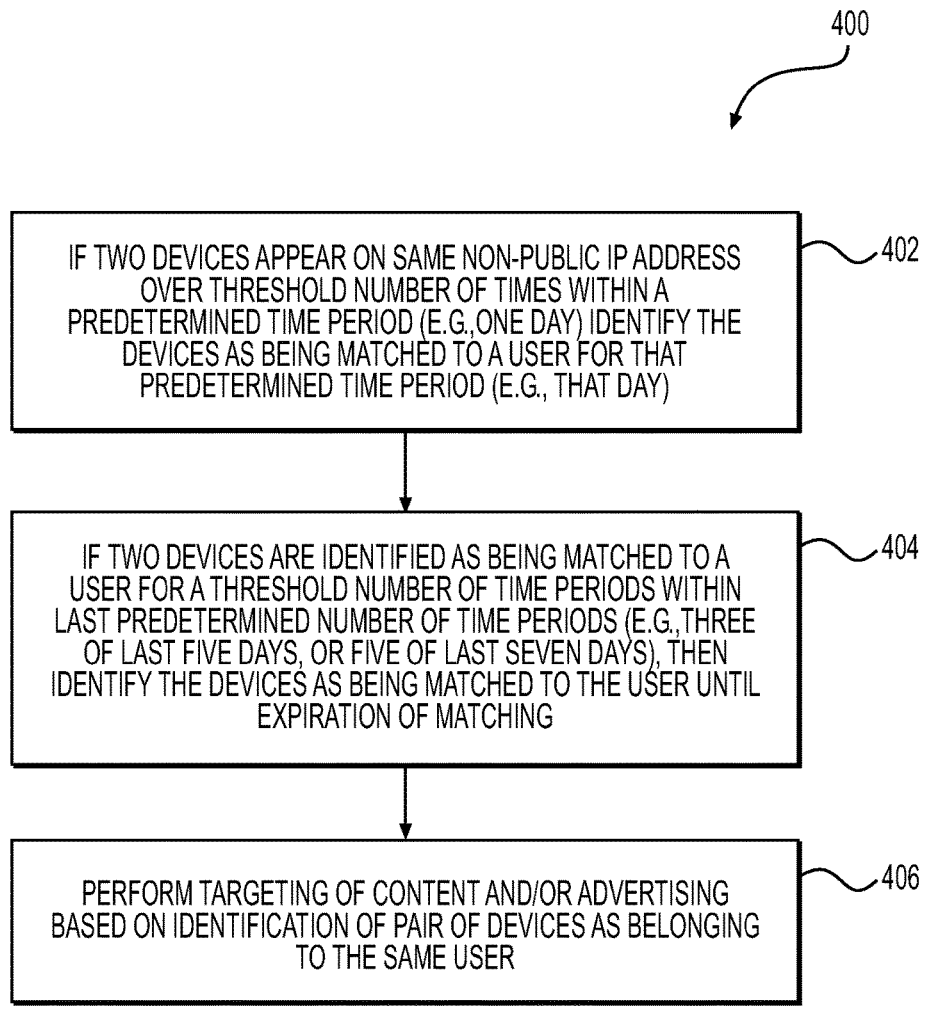
FIG. 4 is a flow diagram of an overview method for performing Internet advertising techniques based on matching users and/or user advertising IDs across devices and browsers, according to an exemplary embodiment of the present disclosure.
Figure 5:
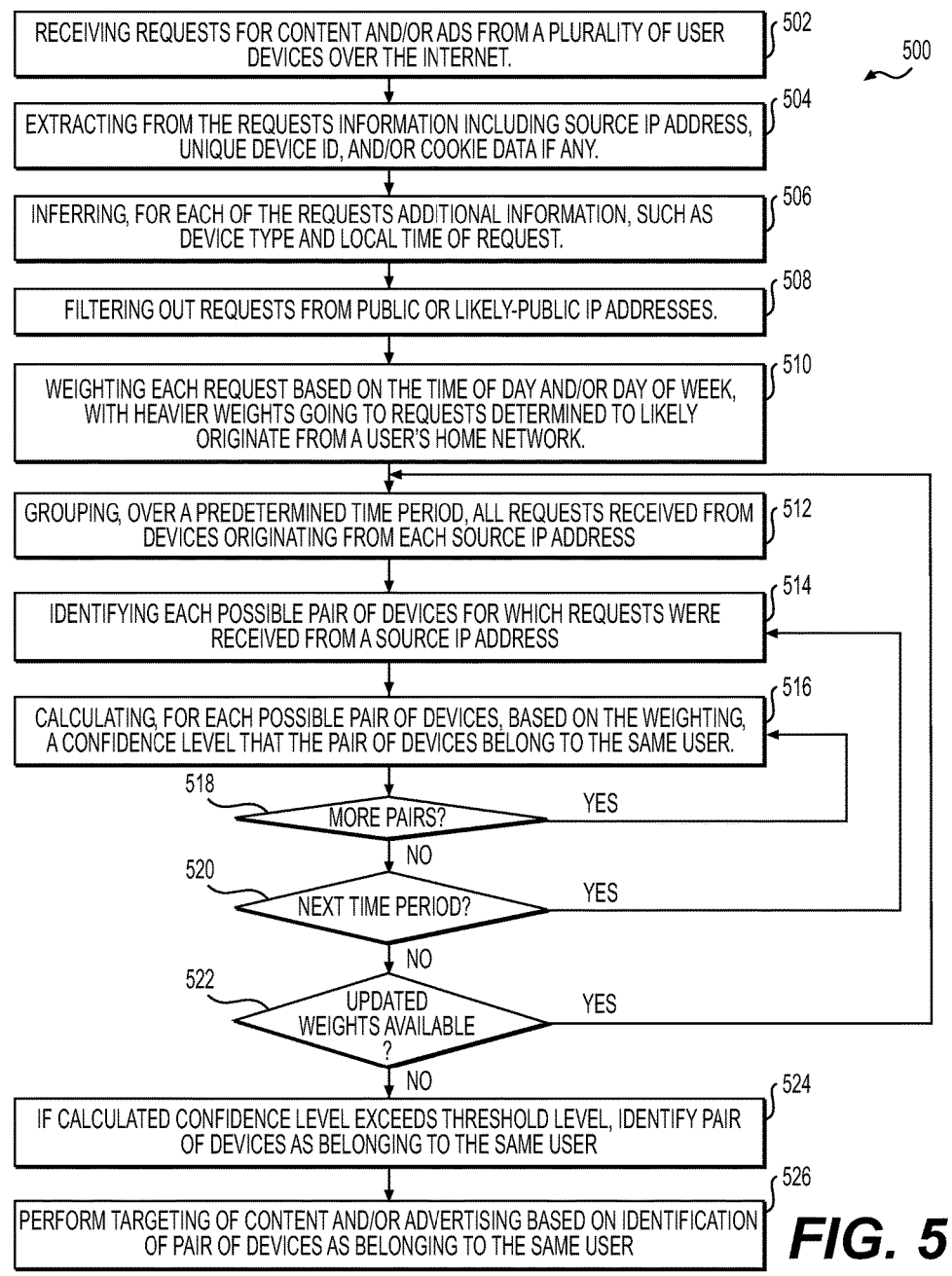
FIG. 5 is a flow diagram of one exemplary method for performing Internet advertising techniques based on matching users and/or user advertising IDs across devices and browsers, according to an exemplary embodiment of the present disclosure.

User matching platform 306 may be configured to, along with mobile services platform 302 and event formatting platform 304, perform techniques involving the methods of FIGS. 4 and 5. In one embodiment, user matching platform 306 may implement a Streaming Aggregation Framework ("SAF"), which may be a highly-scalable framework for quickly and efficiently processing large volumes of mobile and non-mobile Internet events in real-time, for identifying matches between devices. This structure may involve streaming messages through a series of tiers, each tier performing one or more of a plurality of desired operations on the received events before passing on a result message to a subsequent tier. This design structure may allow analysis to be performed in near real time. Specifically, according to certain embodiments, the user matching platform 306 may include a plurality of processing tiers through which event messages received from mobile services platform 302 and/or event formatting platform 304 are streamed and within which processing is performed. Processing may include filtering, aggregating, sorting, applying statistical or mathematical models, and/or routing of outbound result messages to specific destinations.

In one embodiment, user matching platform 306 may identify groups of two or more devices or browsers that are likely owned or operated by a common Internet user. For example, user matching platform 306 may receive event messages from mobile services platform 302 and/or event formatting platform 304, and process those messages according to the methods described below with respect to the flow charts of FIGS. 4 and 5, and forward the results of those methods to the user targeting platform 308 for delivering targeted content and/or advertising to users' devices based on the inferences or insights that a user's two or more devices belong to that same user (e.g., based on merged user profiles, merged device profiles, combined segmentation profiles, etc.) User targeting platform 308 may operate as a service that creates, stores, maintains, and makes available user targeting data to ad servers and other components of user matching system 150. Specifically, user targeting platform 308 may implement one or more of the targeting algorithms described in U.S. Pat. No. 8,504,411 filed by AOL Advertising Inc. on Sep. 14, 2009, and U.S. patent application Ser. No. 13/241,856, filed by AOL Advertising Inc. on Sep. 23, 2011, the entireties of which are hereby incorporated herein by reference.

FIG. 4 is a flow diagram that depicts an exemplary method performed by user matching platform 306 for matching users across various Internet-enabled devices, and by user targeting platform 308 for performing online advertising based on users' identities for targeted and behavioral advertising. Specifically, FIG. 4 depicts a method 400 that includes determining whether two devices appear on the same non-public IP address over a threshold number of times within a predetermined period of time (e.g., within one day). If the two devices appear on the same non-public IP address over a threshold number of times within a predetermined period of time, then the method may include identifying those devices as being matched to a user for that predetermined period of time (e.g., that day) (step 402). For example, the present disclosure may involve various assumptions, such as: if two devices or browsers appear on the IP address of a public network, such as that of a coffee shop or library, then they are not necessarily very likely to be owned or operated by the same individual. However, if two devices or browsers appear on the IP address of a private network, such as that of a person's home wired/wireless network or mobile hotspot, then they are more likely to be owned or operated by the same individual.

As will be described in more detail below, public and private networks may be distinguished based on the number of devices or browsers that "appear on" that network (i.e., for which requests for websites or ads are received). For example, it might be typical or reasonable for a home network to have up to 8 different devices (e.g., 2 per person in avg. household of 4). But a network from which requests are received from 10 different devices might be assumed to be a public network that offers little assurance that two devices are more likely owned or operated by the same person.

Again, if two devices appear on the same non-public IP address over a threshold number of times within a predetermined period of time (e.g., within one day), then the method may identify those devices as being matched to a user for that predetermined period of time (e.g., that day). Of course, the period of time may be any amount of time, such as an hour, six hours, twelve hours, twenty-four hours, etc. Also, the threshold number of times may be any number of times, such as five, ten, twenty, fifty, etc.

Method 400 further includes determining whether the two devices are identified as being matched to a user for a threshold number of time periods within the last predetermined number of time periods (e.g., three of the last five days, or five of the last seven days). If the two devices are identified as being matched to a user for a threshold number of time periods within the last predetermined number of time periods (e.g., three of the last five days, or five of the last seven days), then the method may include identifying those devices as being matched to the user until the match is set to expire (step 404). More specifically, if the time period is six hours, then step 404 might link two devices as likely associated with a common user if those devices are initially linked for three of the four preceding six hour periods. If the time period is one day, then step 404 might link two devices as likely associated with a common user if those devices are initially linked for seven of the ten preceding days. Of course the number of preceding time periods may be set to any value, and the threshold may be set to any number of the preceding time periods, or any percentage of the preceding time periods.

Method 400 may then include performing targeting of content and/or advertising to a user based on the identification of a pair of the user's devices as belonging to the same user (step 406). For example, user targeting platform 308 may leverage the matches and linkages generated by and received from user matching platform 306 to advertise to a user based on an advertising profile common to multiple user devices or a segmentation profile merged from multiple device profiles, and/or based on which device a user is using to access the Internet. For example, if it is determined that a user is using his or her work computer, the advertising may incorporate all of the browsing and demographic data across the user's devices to determine an ad the user will most likely click on while using his or her work computer. If it is determined that a user is using his or her home computer, the advertising may incorporate all of the browsing and demographic data across the user's devices to determine an ad the user will most likely click on while using his or her home computer. If it is determined that a user is using his or her mobile device to access the Internet, the advertising may incorporate all of the browsing and demographic data across the user's devices to determine an ad the user will most likely click on while using his or her mobile device. Thus, the advertising system may be freed from previous constraints of considering only a user's work browsing history when delivering ads to the user's work computer browser, or considering only a user's home browsing history when delivering ads to the user's home computer, or considering only a user's mobile browsing history when delivering ads to the user's mobile device. To the contrary, the advertising system may advantageously use the presently disclosed device matching techniques and related systems and methods to leverage a user's demographic and browsing history across all of the user's devices to identify and deliver targeted ads.

FIG. 5 is a flow diagram that depicts an exemplary method 500 performed by user matching platform 306 for matching users across various Internet-enabled devices, and by user targeting platform 308 for performing online advertising based on users' identities for targeted and behavioral advertising. In one embodiment, method 500 may include receiving "events" or any type of requests for content and/or ads from a plurality of user devices over the Internet (step 502). Events or requests received from user devices may originate from a PC (e.g., laptop or desktop) web browser, a PC application, a mobile web browser, a mobile application, or any other client software that is installed on an end user device and which is capable of making requests via a public network to a system or service that is hosted on a remote system, such as a web server. The request from the user may be for any type or combination of electronic content and/or advertising, whether in textual, graphical, video, and/or audio format. Events may be defined as distinct interactions between a user and a service which can be considered complete and self-contained. In certain embodiments, these interactions may take the form of advertising impressions. An impression may be any request made by client side code (e.g., a JavaScript tag) that results in a request to an ad serving platform that responds with the delivery of an advertising creative. In addition to advertising impressions, events may include any client side initiated request over HTTP/S to a host side process that is able to capture various properties of the request and make them available to the user matching system, such as, for example, events generated by third party content or advertising platforms.

Method 500 may further include extracting from the requests information including: source IP address, unique device ID, and/or cookie data, if any (step 504). In one embodiment, method 500 may include extracting a time of the event (i.e., the time of an impression, click, purchase, etc.), a source IP address, a unique user ID and/or unique device ID, and a user agent. Extracted information may include any information transmitted in the contents of cookies stored on the user's device against the domain of the request, HTTP headers containing information about the user agent and its capabilities (user agent, accept-type, language/locale, etc.), and/or any parameters determined on the client side and appended to the request URL. The extracted information may also include any unique identification of the user's browser or device, such as the value of a cookie, a mobile device identifier, a third party identifier added to the request, or an identifier generated by the application code responsible for sending the request. In each case, as described in more detail below, a value may be passed as part of the request that uniquely identifies either the device or the software upon the device that is originating the request.

Specifically, depending upon the environment within which an event is being triggered, one or more unique identifiers may be available and can be transmitted with the request. In one embodiment, identifiers of user devices or software may be referred to as universal targeting identifiers ("UTIDs"). In one embodiment, the unique identifiers used to describe or identify any particular user device or software (browser or application) may depend on the context of the received request (i.e., the type of software originating the request). In the context of requests received from PC-based browsers or mobile browsers, a unique identifier may include an identifier stored in a cookie text file or in browser local storage. In the context of requests received from a PC-based application, a unique identifier may include an identifier stored in a cookie (which may or may not be shared with a system default browser), or a unique identifier generated by the application or a host of the application, and appended to any HTTP requests for advertising. In the context of requests received from a mobile application, identifiers may be selected based on which mobile platform the application is running on. In one embodiment, a unique targeting identifier may be an Identifier For Advertisers (IFA), an application install specific identifier or an identifier that has been generated by the software package used to create the application, such as a targeting identifier stored in a cookie, an Android ID, a Microsoft ID, or any other suitable identifier. Alternatively, the identifier may be an Identifier for Vendors ("IFV"), which is a common identifier that spans across all apps produced by a specific vendor.

According to certain embodiments, in addition to validating identifiers, method 500 may include formatting captured or logged messages into structures suitable for user matching platform 306. For example, each inbound message may be validated to ensure that the necessary information is present and that it is formatted correctly. In one embodiment, UTIDs may be validated with the following regular expression: [a-zA-Z0-9._-]{14,40}. Messages that do not meet the specification described above may be discarded. Other cleaning, filtering operation and data enrichment may be conducted on the content of the messages to ensure they are suitable to be processed by user matching platform 306.

Method 500 may further include inferring, for each of the requests, additional information, such as device type and local time of request (step 506). In one embodiment, method 500 may include inferring the device family (e.g., mobile phone, tablet device, desktop, laptop, or other) from the user agent, and the time zone of the user from the source IP address. For example, where an event message contains a user agent string, the string may be analyzed using a proprietary database and API, such as those provided from ScientiaMobile Inc. known as Wireless Universal Resource FiLe ("WURFL"), which allows the determination of the device type, the brand, and the operating system of the device. These pieces of information may then be added to the event message for use later in the analysis.

Method 500 may further include filtering out requests from public or likely-public IP addresses (step 508). In one embodiment, public networks and public IP addresses may be filtered out by identifying the number of unique browsers appearing on each IP address within a predetermined period of time. If the count exceeds the predetermined threshold, then the IP address may be flagged as public, or likely-public, so that subsequent events occurring at that IP address for some period of time may be ignored, on the assumption that the appearance of two devices appearing on a public IP address are not likely to be matched to the same user. In one embodiment, step 508 may include counting the number of devices that appear against an IP address over the course of an hour. Once the number reaches a predetermined threshold, the IP address may be added to a blacklist that is broadcast to all processing steps of user matching platform 306. In one embodiment, the threshold may be set as seven or eight devices within a one hour period, and the IP address blacklist may be anywhere from 18-24 hours. Of course, any other desired number of devices, time window, and/or expiration window may be used.

In certain embodiments, to reduce the number of events or messages being sent to subsequent steps for processing, method 500 may include aggregating all events for a given IP address, UTID, Day Timestamp and Week Time Block into multiple minute buckets (e.g., five, ten, or fifteen minute periods), so that, for example, two or more clicks within a couple of minutes are not treated as separate events.

Method 500 may further include weighting each request based on the time of day and/or day of week, with heavier weights going to requests determined to likely originate from a user's home network (step 510). For example, the presently disclosed methods may be performed based on assumptions that requests made while people are statistically more likely to be at home may be more indicative of requests made between devices owned or operated by the same person. For example, if two devices appear on a network during the middle of the day when most people are at work, then those events may be weighted less. If two devices appear on a network in the evening when most people are at home, then those events may be weighted more. Various exemplary methods will now be described for determining the day and time of an event, for purposes of determining the local time of an event and therefore the likelihood that a request originated from a user's home network. To determine what time zone the user is in, the IP address may be matched through a series of APIs against a proprietary database of IP address allocations. Once the time zone has been determined, three values may be calculated: (1) the Day Timestamp (DayTS), (2) the Timezone Neutral Event Timestamp (User Timestamp), and (3) the Week Time Block (WTB). To calculate the User Timestamp, method 500 may be configured to (1) obtain the event timestamp in seconds since epoch in UTC, and (2) subtract the number of seconds the user's location is offset from UTC. For example, if an event takes place at 2013:08:26T09:46:21 UTC, and the user is determined to be located in Hawaii based on their IP address which is 10 hours behind UTC, then the local time may be calculated to be 2013:08:25T23:46:21 HAST. Thus, from the user's perspective the event took place at 23:46:21 on 25 Aug. 2013.

The timezone neutral event timestamp (i.e., user timestamp) may be calculated based on the following:
Event Time in Seconds (UTC): 1377510381
Get the Users Location from IP address: Hawaii—Time Zone HAST
Subtract the UTC difference: 1377510381−36000=1377474381
Timezone Neutral Event Time Stamp (User Timestamp): 1377474381
This value may be the equivalent of the user's local time as if they were in the UTC time zone.

Method 500 may then include calculating the day timestamp ("DayTS") by calculating the start of that day in seconds since the epoch for the purpose of grouping together all events for that user for that date:
Get the start of the day in seconds: 1377474381−(1377474381%86400)=1377388800
Day Time Stamp (DayTS)=1377388800

Method 500 may then include calculating the week time block ("WTB") and day time block ("DTB") of an event. In one embodiment, each week may be divided into fourteen blocks of time, seven of which are times when a user is unlikely to be on their home network, and seven of which are times when a user is likely to be on their home network. By dividing a week into fourteen blocks, the week time block may represent not only whether the user is likely home (day vs. morning and evenings), but also whether the day is a weekday or weekend. In one embodiment, each day may be assigned an integer starting from Sunday as "1," Monday as "2," and so on, to Saturday as "7," allowing one day to be weighted higher than another in the subsequent algorithmic processing.

In one embodiment, the week time block may be calculated as: ((Day of the Week−1)×2)+Day Time Block, where the Day Time Block is determined as follows:
00:00:00-07:59:59=0
08:00:00-17:59:59=1
18:00:00-23:59:59=0

As a result, the Week Time Blocks may be calculated as follows:

|  | Sun (1) | Mon (2) | Tues (3) | Wed (4) | Thurs (5) | Fri (6) | Sat (7) |
|---|---|---|---|---|---|---|---|
| HOME | 0 | 2 | 4 | 6 | 8 | 10 | 12 |
| AWAY | 1 | 3 | 5 | 7 | 9 | 11 | 13 |

Method 500 may further include grouping, over a predetermined time period, all requests received from devices originating from each source IP address (step 512). Each message corresponding to each event aggregated for a particular source IP address may have one or more of the following fields: IP Address, Event Time Stamp, Unique Targeting Identifier (UTID), Day Timestamp (dayTS), Week Time Block (WTB), User Timestamp, Device Type, Device Brand, and Device Operating System.

In one embodiment, method 500 may include identifying links between pairs of devices by aggregating all events together over a period of time by IP address, weighting the occurrences of events based on the week time block, summing these occurrences for all occurrences in that window, and generating a score for the pair of devices. Thus, method 500 may further include identifying each possible pair of devices for which requests were received from a source IP address (step 514). In one embodiment, all devices (i.e., UTIDs) having events that occur against the same IP address in a given Day Timestamp may be pooled together and all the possible pairwise combinations of UTIDs may be computed. Thus, if the IP address for a given household shows devices A, B, C, and D, step 514 may include identifying pairs AB, AC, AD, BC, BD, and CD.

Method 500 may further include calculating, for each possible pair of devices, based on the weighting, a confidence level that the pair of devices belong to the same user (step 516). In one embodiment, the confidence level may be calculated based on a mathematical or statistical model of weightings and likelihoods that a device is being operated in the home, and/or that two particular devices are owned or operated by the same user. In one embodiment, for each pair that has been identified, a weight may be calculated based on the week time block and the number of times the UTIDs were seen. week time blocks during which a user is likely to be on their home network and not a public network are given greater weight. In one embodiment, to determine if a week time block represents a period when a user is more likely to be on a home or private network the modulus of the week time block divided by two may be calculated, if the remainder is greater than 0 then the week time block was an odd number and represents a period when the user was more likely to be on a public network. To calculate the weight, the frequency of occurrence of each UTID on the IP address is multiplied by a weighting factor if the event occurred in a Week Time Block that represents a greater chance of being on a home or private network. In one exemplary embodiment, the weighting factor may be set to "2" and can be configured dynamically. In one embodiment, only those pairs that have a weighting score that meets a minimum predetermined threshold are sent on to subsequent steps of determining a confidence of the devices being matched to a common user. In one embodiment this threshold may be set to 3 and may be configured dynamically.

If, at step 518, it is determined that additional pairs of devices exist within the set of devices aggregated for the source IP address over the preceding time period, then method 500 may include returning to step 516 to further calculate, for the possible pair of devices, based on the weighting, a confidence level that the pair of devices belong to the same user. If, at step 520, it is determined that a time period has elapsed, then method 500 may include returning to step 512 to update a grouping of requests received from all devices originating from the source IP address. If, at step 522, it is determined that updated weights are available, then method 500 may include returning to step 512 to update a grouping of requests received from all devices originating from the source IP address based on recent weights last generated at step 510.

Method 500 may further include identifying a pair of devices as belonging to the same user if the calculated confidence level exceeds a threshold level (step 524). Specifically, step 524 may include receiving a weight assigned to each possible pair of devices that might be matched to a common user. For example, step 524 may include, for a particular pair of devices, receiving a message including one or more of the following fields: UTID 1, UTID 2, IP Address, Day Timestamp (dayTS), Weight, UTID 1 Device Type, UTID 1 Device Operating System, UTID 1 Device Brand, UTID 2 Device Type, UTID 2 Device Operating System, and UTID 2 Device Brand.

In one embodiment, the confidence level for a particular pair of devices may be calculated by aggregating all weights calculated for each event message received for that pair over a preceding period of time, such as over a 24 hour period starting from the first instance the pair is identified. At the end of the 24 hour window a series of algorithms may be executed to determine a final confidence score for that 24 hour period and an overall confidence score for that link for all time. In one embodiment, once all link events for a pair of UTIDs across all IP addresses they occur upon have been aggregated for 24 hours, method 500 may perform an evaluation of the weights of each of the events to calculate a daily (or 24 hour) confidence score. In one embodiment, if the matched pair has been identified it is assigned a value of 20; otherwise it has a value of zero. The logic in this algorithm can be extended to provide a more complex analysis of the daily weight scores when determining the daily confidence score.

In one embodiment, a final confidence score may be a value between 0 and 100. This value may be used to decide if an identified link is sufficiently well established by comparison with a configurable threshold value. In one embodiment, this value may be set to 60. In one embodiment, the final confidence score may be calculated by taking into account the confidence score achieved on previous days plus any so-called "confidence boosters" (described later). The amount the historic confidence scores can contribute is configured as a proportion of the overall confidence score. In one embodiment, this value may be set to 80, meaning that historic confidence scores alone are enough to permit a link to be considered confidently established. The total number of days to include in the historic lookback is a configurable value, which in some cases may be set to four. For each of the days in the historic look back a proportion of the total available score may be allocated. This is configurable and is currently set to:

Current Day: 20
Current Day −1: 20
Current Day −2: 20
Current Day −3: 20
Total possible score: 80

As an example, assuming the existence of two devices (A and B) in a pair, if these two devices have been seen consistently over the last three days and each has scored enough to be considered suitable for an initial matching determination, a subsequent step may make a binary decision that the link exists and allocates it a score of 20 for each day the link was seen. The scores for the last four days would be 0, 20, 20, 20 giving a total score is 60, which meets the threshold and qualifies the relationship as a confident link.

As a second example, if devices A and B were seen together on current day −2 and today with a high enough score to be passed to tier 4 but on current day −1 the threshold was not met. As a result the daily scores for the last 4 days were 0, 20, 0, 20 and the total 40, which would not be enough to meet the overall threshold to say the relationship qualifies as a confident link unless there is another boosting factor which improves the overall score (see below). This rolling window means that as links appear and disappear their score goes up and down, the more consistently a match or link is identified, then the more likely it is that the pair will be determine to be a valid relationship. For example, taking the second example, if the linked pair is observed again on a 5th day, looking back 4 days would now yield daily scores of 20, 0, 20, 20 with a total of 60, which is a score that is high enough to be confident about the link according to the exemplary threshold.

Of course, all of the above-described parameters, such as number of days to look back, the possible score available on each day, the total available scores, and the threshold values, can be configured while the system is running, which allows insights to be implemented in real time into the system and the overall algorithm performance to be fine-tuned.

Once a link has been established it may be considered valid for a configurable period of time (link expiry time). In one embodiment, this may be set to four days, which means that even if the confidence score drops below the threshold value, the link is still considered valid until the expiry time is reached. The expiry time is reset each day that the link exceeds the threshold value, which means that a user can stop creating events on both devices for a period of time without causing the relationship to be forgotten (e.g., they may have gone on vacation and only taken one of the devices with them). It also means that if a link was established that was invalid it would only take four days for that relationship to be broken. Overall these processing steps help to ensure that the accuracy of the established links is high.

In certain embodiments, a confidence score may be "boosted" based on one or more additional factors. For example, a booster may be a property that can be assessed about the relationship between two devices that adds weight to the belief that the two devices are linked. A booster can only add confidence to an already established link.

In one embodiments, some third parties may be able to provide data to us that can be used to validate if an identified link is real. In one example, a third party is able to map together device IDs and household registration data using some proprietary mechanism. They make this data available as a feed which is ingested into the user matching platform 306. For example, when a link is identified, method 500 may determine if both the UTIDs are found within the third party data set and if they are linked to the same household identifier. If this relationship is present, a boosting factor may be applied to the confidence score for the link. The value for the boosting factor is configurable, and by way of example may be set to 20. Where a user logs into a system on both devices (perhaps an email or messaging service), it may be determined that a solid link exists. In one embodiment, boosting factor of 100 could be applied ensuring that the link automatically is considered confirmed.

In some cases, the user may interact with a third party service which provides some kind of identifier for the user. This could be a mobile operator adding a header to all devices that belong to a particular user accessing their network, or a user authenticates with a website using a social networking identifier. If this identifier is found appearing on both devices in a link, then method 500 may apply a booster reflecting certainty that this is the same user on both devices. A boosting factor of 100 could be applied to indicate that significant confidence exists about the link.

When a link has been identified between two devices it is possible to look at the existing targeting data for each device. If there is a strong correlation between the two targeting profiles this may add weight to the link. A boosting factor of 20 could be applied which may be enough to push the confidence score for the link above the threshold.

The device type may provide another boosting factor. For example, it has been possible to validate using other available data that when a link is identified between two tablet devices, a high proportion of the time it is the same user. This means that when a link is identified between two tablet devices it may be desirable to apply a boosting factor that is proportional to a previous assessment of the accuracy of this type of link.

It may be the case that once a user has purchased a device in a particular technology eco system (e.g., Android devices, iOS devices) that they are more likely to purchase another device in the same ecosystem when buying a tablet or new mobile phone. It may, with some combinations of operating system or brand, be appropriate to apply a boosting factor to reflect this.

Likewise, when a link has been established that meets or exceeds the confidence threshold and that has an expiry date set, a record of this may be stored in the local system of record. In the situation where a confidence score is determined multiple times within a single day, the system of record may be consulted and the highest score may be used. This could happen where a link is determined via different processing flows or where the same data has been fed to multiple algorithms.

Method 500 may further include performing targeting of content and/or advertising based on identification of pair of devices as belonging to the same user (step 526). For example, for purposes of illustration, an individual's smartphone might have the device ID "UTID: 123" and be associated with features "x, y, z," their tablet might have the device ID "UTID: 456" and be associated with features "a, b, z," and their PC might have the device ID "UTID: 789" and be associated with features "i, j, z." In this case, the individual might have a profile that associates the individual with all of the features, "a, b, i, j, x, y, z." Likewise, the individual might have a profile that aggregates the segmentation and/or targeting profiles associated with each of the user's three devices.

Figure 6:
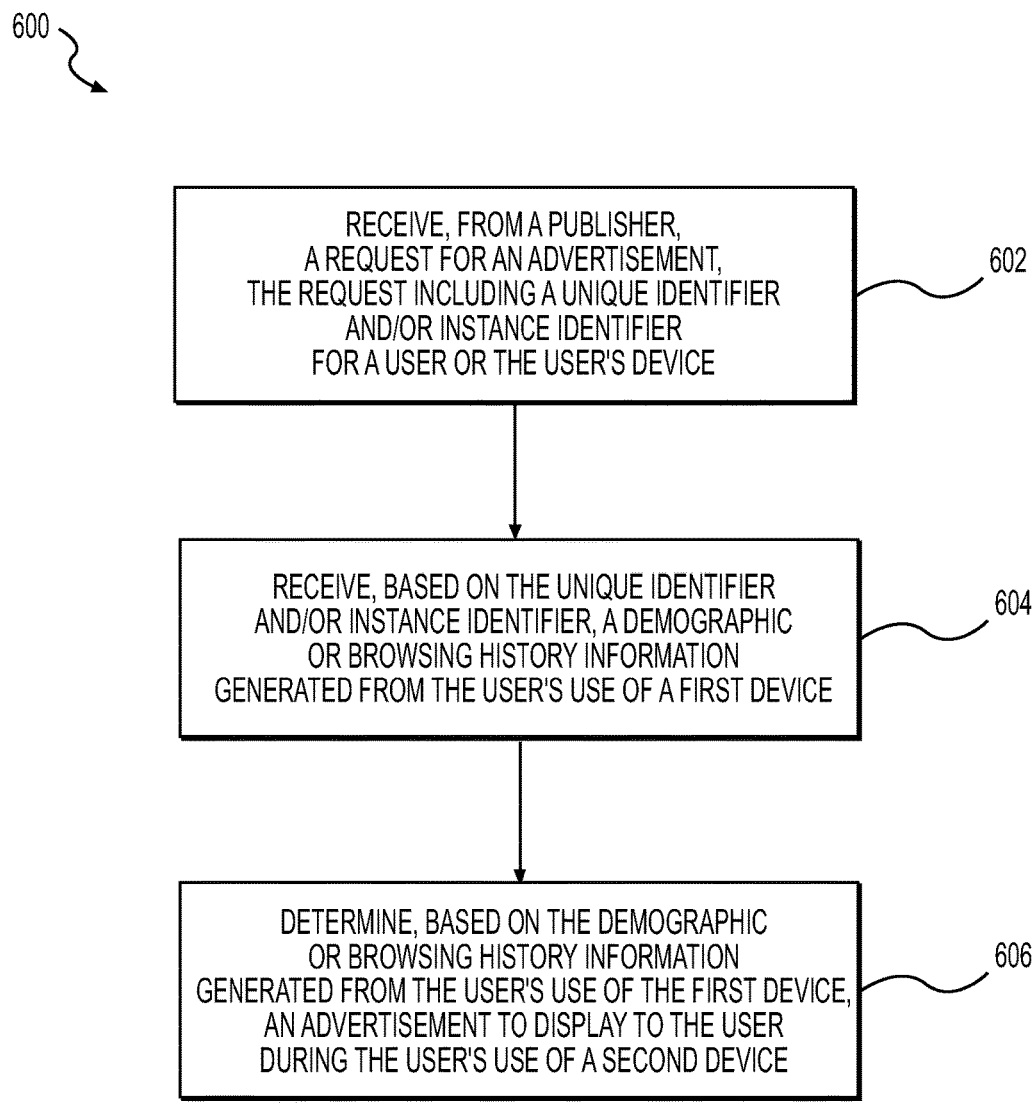
FIG. 6 is a flow diagram of another exemplary method for performing Internet advertising techniques based on matching users and/or user advertising IDs across devices and browsers, according to an exemplary embodiment of the present disclosure.

FIG. 6 is a flow diagram of a method performed by user matching platform 306 for matching users across various Internet-enabled devices, and by user targeting platform 308 for performing online advertising based on users' identities for targeted and behavioral advertising, according to an exemplary embodiment of the present disclosure. Specifically, FIG. 6 depicts a method 600 for executing techniques between ad servers 152, user matching processor 154, and/or databases 156 of user matching server systems 150 to advertise to users based on data collected across a plurality of devices they may use.

In one embodiment, method 600 may include receiving, from a publisher, a request for an advertisement, the request including a unique identifier and/or instance identifier for a user or the user's device (step 602). While an ad request may be received from a publisher, an ad request may alternatively or additionally be received from the user or from the user's device. Specifically, an ad server 152 may receive a request to deliver an ad or ad tag to a user upon the user requesting and/or visiting a web page hosted on a publisher server 112. In one embodiment, the ad request may include the unique ID assigned to the user, the instance ID assigned to the user's device, and/or cookie data containing one or both of the unique ID and the instance ID. As described above with respect to FIG. 3, the unique ID and/or instance ID may have been matched or linked by user matching platform 302 with a unique ID and/or instance ID of one or more other devices of a plurality of the user's devices.

Method 600 may further include receiving, based on the unique identifier and/or instance identifier, a demographic or browsing history information generated from the user's use of a first device (step 604). Upon receiving the unique identifier and/or instance identifier, an ad server 152 and/or user matching processor 154 of the user matching server 150 may lookup demographic and/or browsing history information generated from the user's use of a first device. For example, the ad server 152 and/or user matching processor 154 may search databases 156 for the unique identifier and/or instance identifier to find indexed browsing history, demographic data, behavioral information, user profiling information, purchase history, etc. The stored historical data may be data generated from the user's first device or any other device having local storage containing the unique identifier and/or instance identifier.

Method 600 may further include determining, based on the demographic or browsing history information generated from the user's use of the first device, an advertisement to display to the user during the user's use of a second device (step 606). Specifically, when a user uses a second device to request web content, e.g., from a publisher server 112, the user's second device may also request an ad from an ad server 152. Because the user's second device may send an ad request containing the user's unique identifier or instance identifier, the ad servers 152 and/or user matching processor 154 may again lookup demographic or browsing history information generated from the user's use of a first device. For example, the ad server 152 and/or user matching processor 154 may search databases 156 for the unique identifier and/or instance identifier to find indexed browsing history, demographic data, behavioral information, user profiling information, purchase history, etc. The stored historical data may be data generated from the user's first device or any other device having a unique identifier or instance identifier that is matched by user matching platform 306 with the unique identifier and/or instance identifier. As a result, the ad servers 152 and/or user matching processor 154 may be able to serve ads on the user's device based on one or more of: browsing history, demographic data, behavioral information, user profiling information, purchase history, any or all of which may be based on data collected from more than one device used by the user.

In general, publishers 112 may host websites having web pages that display content and advertising. In general, when a user uses a device 102-110 to visit a web page hosted on a publisher server 112, the publisher may send an impression request to an ad network, in this case, an ad server 152. In the impression request, the publisher 112 may request an advertisement to display to the visiting user. The impression request may include any data elements normally included in an impression request, such as information about the web page, the publisher, and/or the visiting user. The advertising system may select an advertisement for the publisher to display based on an algorithm that considers the received information about the web page, the publisher, and/or the visiting user. Thus, the Internet advertising system may, consistent with its ad bidding and exchange techniques and various business rules, award impressions of ads to impression requests from publisher servers 112. In other words, the Internet advertising system, through ad servers 152, may cause ads received from advertiser servers 114 to be displayed on web pages hosted on publisher servers 112 when users devices 102-110 request those web pages. Of course, as discussed above, the display of the ads may be precisely targeted both to the identities of the users and publishers of servers 112, and the content of the publisher's web page. For example, the Internet advertising system may select for display the ad that is most likely to generate a strong and favorable reaction from the visiting user, based on assumptions, historical data, and statistics gathered about the publisher's site and the user.

A number of use cases are applicable to the above described method of FIG. 6., as performed by user matching system 150. For example, if a user visits a website upon which a pixel is embedded, this pixel may add the user to a population of users. The user then visits a different website upon their mobile device upon which an advert is displayed. Because the user was added to a population upon their desktop computer, the user may be immediately retargeted with an appropriate advertising for that population on their mobile device.

As another example, a user might visit a website on their mobile device and view an advertisement. The advertisement may advertise a specific product that the user is interested in and the user may click on the advertisement, but not purchase the product at that time. Later, when the user is navigating around the Internet on their desktop or laptop, the user may be targeted with an advertisement for the product (or related products) that the user originally saw and expressed an interest in on their mobile device.

As another example, a user of a laptop or desktop computer may visit many websites, and view many online advertisements, and over time a profile of their interests are generated. The user may also use a mobile device (mobile phone or tablet) to access the Internet. The two devices (i.e., the PC and the mobile device) may be linked together (either through a common profile, or associated unique IDs), thereby allowing content and advertising to be targeted to any of these devices (mobile, tablet, and desktop) using the interest profiles generated on the user's desktop computer.

As another example, a user of a laptop or desktop computer may use multiple browsers to access the Internet. Each browser used by the user may have a separate identity for the purposes of tracking and targeting the user. As these devices are linked together according to the disclosed embodiments, it may be possible to target advertising and content appropriate for that user across all of the browsers they use.

As another example, a user may view on their mobile device an advertisement for a product or service that they are interested in. Later, the user may use their desktop computer to purchase the same product or service. Because the two devices are linked together according to the disclosed embodiments, it may be possible to attribute the purchase to the advertisement they saw on their mobile device allowing cross device, or cross screen, attribution, and allowing reporting and insights to be generated.

As another example, a user may view an advertisement for a specific campaign on their desktop or laptop. The campaign may be frequency capped to only display to a user once. The user may then navigate around the Internet using their tablet device and encounter pages containing advertisements. Because the two devices may be linked together according to the disclosed embodiments, the advertising network may avoid showing the campaign to the same user again on their tablet device, so as to honor the frequency cap for the campaign reached by the user on their desktop.

As described above, the user's first device and second device may be any type of device 102-110 described with respect to FIGS. 1 and 2. Also, it should be appreciated that any number of devices may be applicable within the scope of the description of FIGS. 3-8. In addition, it should be appreciated that, although depicted as different, ad or publisher servers may optionally be the same server; and although depicted as a single server system, ad or user matching server systems 150 may be separate and distinct servers accessed by the user's multiple devices, such as devices.

For example, the ad or user matching server(s) may determine, based on the demographic or browsing history information generated from the user's use of the first device, an advertisement to display to the user during the user's use of a second device. Specifically, when a user uses a second device to request web content, e.g., from a publisher server 112, the user's second device may also request an ad from an ad server 152. Because the user's second device may send an ad request containing a unique ID which is matched by user matching platform 306 with a unique ID of the first device, the ad servers 152 and/or user matching processor 154 may again lookup demographic or browsing history information generated from the user's use of a first device. For example, the ad server 152 and/or user matching processor 154 may search databases 156 for the unique identifier and/or instance identifier to find indexed browsing history, demographic data, behavioral information, user profiling information, purchase history, etc. As a result, the ad servers 152 and/or user matching processor 154 may be able to serve ads on the user's device based on one or more of: browsing history, demographic data, behavioral information, user profiling information, purchase history, any or all of which may be based on data collected from more than one device used by the user.

According to certain embodiments, the advertising systems may then advertise to a user based on which device a user is using to access the Internet. For example, if it is determined that a user is using his or her work computer, the advertising may incorporate all of the browsing and demographic data across the user's devices to determine an ad the user will most likely click on while using his or her work computer. If it is determined that a user is using his or her home computer, the advertising may incorporate all of the browsing and demographic data across the user's devices to determine an ad the user will most likely click on while using his or her home computer. If it is determined that a user is using his or her mobile device to access the Internet, the advertising may incorporate all of the browsing and demographic data across the user's devices to determine an ad the user will most likely click on while using his or her mobile device. Thus, the advertising system may be freed from previous constraints of considering only a user's work browsing history when delivering ads to the user's work computer browser, or considering only a user's home browsing history when delivering ads to the user's home computer, or considering only a user's mobile browsing history when delivering ads to the user's mobile device. To the contrary, the advertising system may advantageously use the presently disclosed unique identifier and related systems and methods to leverage a user's demographic and browsing history across all of the user's devices to identify and deliver targeted ads.

The presently disclosed systems are configured to allow different platforms and algorithms (e.g., various processing steps) to be chained together in different ways. This configuration can be changed at startup. This allows algorithms to be added and removed. Many parameters used in the algorithm can be configured dynamically while the system is running. This makes it possible to fine tweak the performance of the algorithms without interrupting processing. In addition, multiple routes to be defined within the platform, allowing the same source events to be routed through different algorithm stacks and the output results to be compared. This opens the possibility for enabling machine learning, where the system performs multiple processing streams in parallel, and based on a measurement of the performance of the different processing routes to select which result to use in the final confidence determination.

Figure 7:
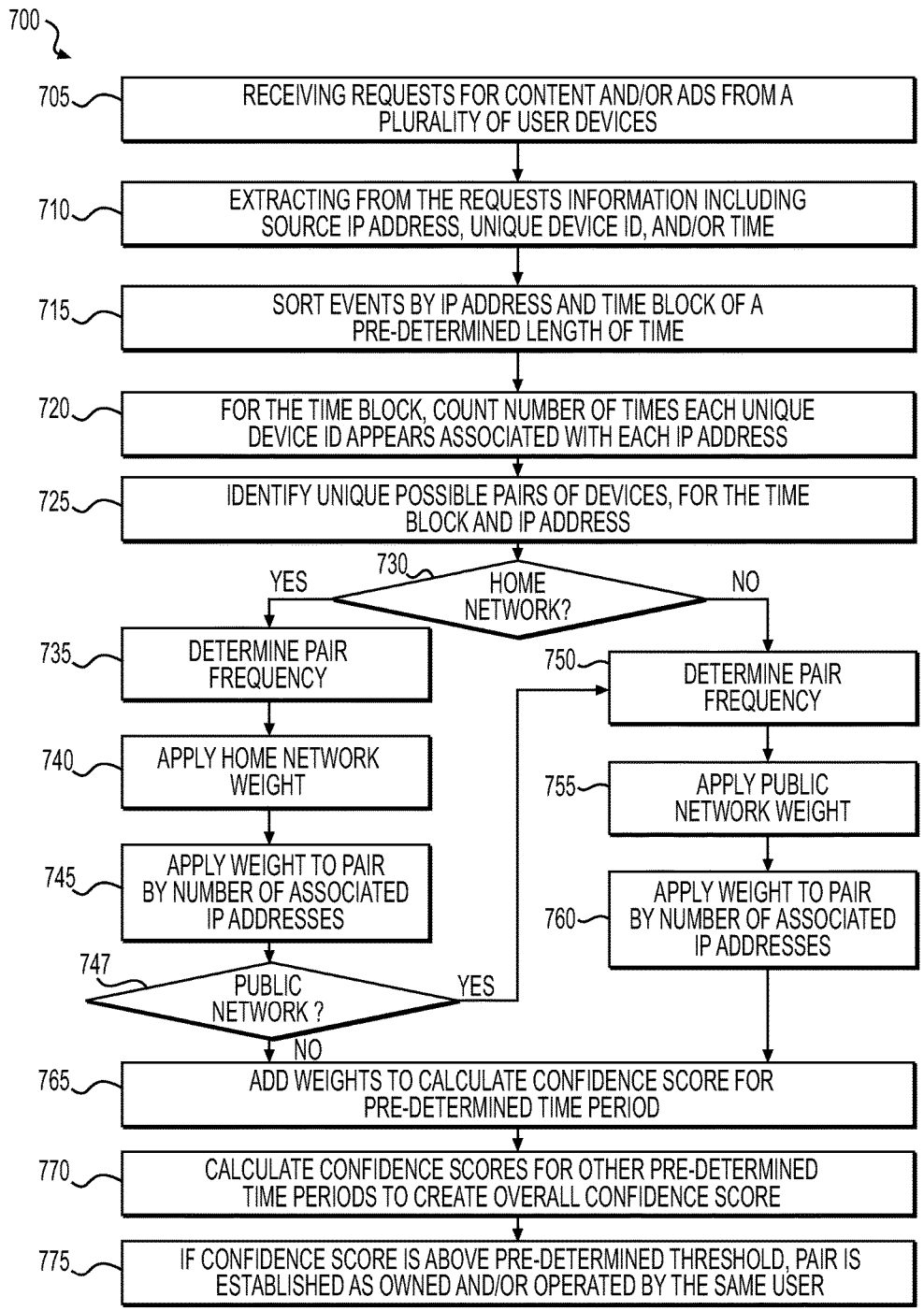
FIG. 7 is a flow diagram of another exemplary method for performing Internet advertising techniques based on matching users and/or user advertising IDs across devices and browsers, according to an exemplary embodiment of the present disclosure.

FIG. 7 is a flow diagram that depicts yet another exemplary method 700 performed by user matching platform 306 for matching users across various Internet-enabled devices, and by user targeting platform 308 for performing online advertising based on users' identities for targeted and behavioral advertising. In one embodiment, method 700 may include receiving "events" or requests of any type for content and/or ads from a plurality of user devices over the Internet or other network (step 705). As discussed above, events or requests received from user devices may originate from a PC (e.g., laptop or desktop) web browser, a PC application, a mobile web browser, a mobile application, or any other client software that is installed on an end user device and which is capable of making requests via a public network to a system or service that is hosted on a remote system, such as a web server.

Method 700 may further include extracting information from each request including: source IP address, unique device ID (or UTID), timestamp, user agent and/or cookie data (step 710). In one embodiment, method 700 may include extracting a time of the event (i.e., the time of an impression, click, purchase, etc.), a source IP address, a unique user ID and/or unique device ID, and a user agent. Extracted information may include any information transmitted in the contents of cookies stored on the user's device against the domain of the request, HTTP headers containing information about the user agent and its capabilities (user agent, accept-type, language/locale, etc.), and/or any parameters determined on the client side and appended to the request URL.

According to certain embodiments, in addition to validating identifiers according to methods discussed previously, method 700 may include formatting captured or logged messages into structures suitable for user matching platform 306. For example, each inbound message may be validated to ensure that the necessary information is present and that it is formatted correctly. In one embodiment, UTIDs may be validated with the following regular expression: [a-zA-Z0-9._-]{14,40}. Messages that do not meet the specification described above may be discarded. Other cleaning, filtering operation and data enrichment may be conducted on the content of the messages to ensure they are suitable to be processed by user matching platform 306.

Method 700 may further include inferring, for each of the requests, additional information, such as device type and local time of request. In one embodiment, method 700 may include inferring the device family (e.g., mobile phone, tablet device, desktop, laptop, or other) from the user agent, and the time zone of the user from the source IP address. For example, where an event message contains a user agent string, the string may be analyzed using a proprietary database and API, such as those provided from ScientiaMobile Inc., known as Wireless Universal Resource FiLe ("WURFL"), which allows the determination of the device type, the brand, and the operating system of the device. These pieces of information may then be added to the event message for use later in the analysis.

In certain embodiments, in part to reduce the number of events or messages being sent to subsequent steps for processing, at step 715 method 700 may include aggregating all events for a given IP address, UTID, Day Timestamp, and WTB into multiple minute buckets (e.g., five, ten, or fifteen minute periods), so that, for example, two or more clicks within a couple of minutes are not treated as separate events.

Method 700 may include calculating the week time block (WTB), and day time block (DTB), as discussed previously. In one embodiment, each week may be divided into fourteen blocks of time, seven of which are times when a user is unlikely to be on their home network, and seven of which are times when a user is likely to be on their work network. By dividing a week into fourteen or any number of blocks, the WTB may represent not only whether the user is likely home (day vs. morning and evenings), but also whether the day is a weekday or weekend.

Method 700 may further include grouping, over a predetermined time period or time block, all requests received from devices originating from each source IP address (step 715). For example, the predetermined time period may correspond to a week, and requests included in each group would be associated with the same WTB. Each message corresponding to each event aggregated for a particular source IP address may have one or more of the following fields: IP Address, Event Time Stamp, UTID, Day Timestamp (dayTS), WTB, DTB, User Timestamp, Device Type, Device Brand, and Device Operating System.

In one embodiment, step 720 may include counting the number of times each device appears or submits requests using each IP address over a predetermined time period or time block to form a frequency count for each device. This may include counting the number of times a device is newly associated with a given IP address, counting a number of predetermined units of time each device is associated with a given IP address, and/or counting the number of events a given device is associated with while using a given IP address, etc.

In one embodiment, method 700 may further include identifying each unique, nonrepeating possible pair of devices for which requests were received from each source IP address and time block (step 725). In one embodiment, all devices (i.e., UTIDs) having events that occur against the same IP address in a given, for example, Day Timestamp may be pooled together and all the possible pairwise combinations of UTIDs may be computed. Thus, if the IP address for a given household shows devices A, B, C, and D, step 725 may include identifying possible pairs AB, AC, AD, BC, BD, and CD. The confidence score to be calculated for each pair will indicate whether the pair is likely owned and/or operated by the same user.

Method 700 may further include weighing each request based on the time of day and/or day of week, with potentially differing weights going to requests determined to likely originate from a user's home network and requests determined to likely originate from a public network (step 730). The various methods of determining whether a given request is statistically likely to originate from a home network or a public network are discussed above, and may be variously utilized by method 700.

If at least one occurrence of a pair of events likely originated from a user's home network, at step 735, the pair frequency may be determined. The frequency counts for each device ID in each pair identified in step 725 may be added, multiplied, or otherwise augmented in a predetermined manner set by a user and/or administrator to obtain an overall home frequency count or weight for each pair associated with events from at least one home network.

Method 700 may further include applying a predetermined home network weight to each overall home frequency count for each pair associated with a home network (step 740). This predetermined weight may be set by a user and/or administrator, and may determine how much weight a home network is accorded when calculating a confidence score that a given pair of devices are owned and/or operated by the same user. For example, if a home network is to be given no additional weight for a given possible pair of devices, the overall home frequency count for the pair may be multiplied by one.

Method 700 may further include applying a predetermined additional weight based on the number of additional IP addresses associated with each pair of devices associated with a home network (step 745). This allows a pair of devices to receive an additional weight if the pair was seen on another IP address and/or network. This may include any form of arithmetic application of the weight, including simply multiplying the overall home frequency count for the pair by the number of additional IP addresses for which events were received over the predetermined time period, for example, over a WTB. Additional IP addresses may be accorded a different weight if they are a public (non-home) IP address. For example, if the pair of devices is associated with a home network IP address, and the same pair is also associated with a public network IP address, a higher weight may be applied than if both IP addresses are home network IP addresses. After weighing by the number of IP addresses with which a given pair is associated, overall home network weights for a pair of devices may be obtained. Steps 735-745 may be repeated for each pair associated with a home network.

If a given possible pair of devices is also associated with events received from an IP address likely to be a public network (step 747), or if, at step 730, possible pairs are only associated with events received from IP addresses likely to be on a public network, method 700 may further determine an overall public pair frequency weight (step 750). Public networks may include a user's office, public transport, public place, etc., as discussed above.

Method 700 may further include adding together the number of times each of the device IDs in a given pair was seen on each IP address associated with a public network in a predetermined manner to apply a weight for a given IP address over the predetermined time period (step 750). This may include any form of arithmetic application of the weight, and weights may be set by a user and/or administrator in a predetermined manner. Each of these frequencies for each pair may be added together to determine the overall public pair frequency for each possible pair of devices.

At step 755, a predetermined public network weight may be applied to each pair, for example by augmenting each public frequency count. This predetermined weight may be set by a user and/or administrator, and may determine how much weight each type of network is given when calculating a confidence score that a given pair of devices are owned and/or operated by the same user. For example, if a public network is to be given substantial weight for a given possible pair of devices, the overall public pair frequency count for the pair may be multiplied by two.

Method 700 may further include applying a predetermined additional weight based upon the number of IP addresses associated with each pair of devices associated with a public network (step 760). This may include any form of arithmetic application of the weight, including simply multiplying the overall public frequency count for a given pair by the number of IP addresses associated with the given pair over the predetermined time period. Additional IP addresses may be accorded a different weight based on whether they are a home (or private) IP address. For example, if the pair of devices is associated with a public network IP address, and the same pair is also associated with a home network IP address, a higher weight may be applied than if both IP addresses are public network IP addresses. After weighting by the number of additional IP addresses associated with the pair, overall public network weights for one or more pairs of devices may be obtained. Steps 750-760 may be repeated for each pair of devices associated with a public network.

Method 700 may further include adding the overall public network weight and overall home network weights together for the predetermined time period to calculate a confidence score that each pair of devices are owned and/or operated by the same user (step 765). This process may be repeated by adding the overall public network weight and overall home network weight for each pair of devices to obtain a confidence score for each pair. This may determine a confidence score for each pair for a second predetermined time period. For example, the confidence score for a possible pair for a given week time block may be calculated, which may be considered the day confidence score. The following day, the confidence score for the past week may be recalculated to obtain that day's confidence score.

At step 770, multiple confidence scores of a second predetermined time period may be combined together to create an overall confidence score for each possible pair of devices. These may be referred to as "confidence boosters," as discussed above. For example, multiple day confidence scores may be combined to create an overall confidence score for each pair of devices. This may require normalizing each day confidence score to create an indexed score.

Method 700 may further establish one or more possible pairs as owned and/or operated by the same user if the overall confidence score for any of the possible pairs is above a predetermined threshold. The predetermined threshold may be set by a user and/or administrator. Method 700 may further include identifying a pair of devices as belonging to the same user if the calculated confidence level exceeds a threshold level (step 775). Specifically, step 775 may include receiving a weight assigned to each possible pair of devices that may be matched to a common user. For example, step 775 may include, for a particular pair of devices, receiving a message including one or more of the following fields: UTID 1, UTID 2, IP Address, Day Timestamp (dayTS), Weight, UTID 1 Device Type, UTID 1 Device Operating System, UTID 1 Device Brand, UTID 2 Device Type, UTID 2 Device Operating System, and UTID 2 Device Brand. Based on one or more of these fields, a pair of devices may be established as owned and/or operated by the same user. In accordance with other methods presented herein, upon an established identification of one or more pairs of devices as belonging to the same user, identical and/or similar targeted content and/or advertising may be directed to the user on both devices.

The steps of method 700 may be performed in multiple ways. For example, the steps of method 700 may be performed in any order, and each step may or may not be performed. Method 700 may be performed, for example, without determining whether an IP address is likely associated with a home or public network. Additional weighting may be applied for each additional IP address with which a given pair of devices is identified. Additional weights in method 700 may be applied when a given pair of devices is identified as associated with two or more network types such as, for example, if the pair is identified in both a likely private network and a likely public network. Weights applied in methods presented herein may also increase or decrease for each additional IP address and/or network type with which a pair of devices is associated, which may provide a "multiplier" effect. In another embodiment, additional weights may be applied in steps 730-760 only for pairs of devices that are identified in both a likely home or private network and a likely public or non-home network. Steps 730-760 may be performed iteratively for each possible pair of devices that may be owned and/or operated by the same user. The method 700 may be performed in combination with any of the techniques discussed herein. Further, the confidence scores for the at least one pair of devices may be recalculated at any time if the weights are updated.

The techniques presented in method 700 dramatically enhance the ability to identify when a given pair of devices is or is not operated by the same user. The steps of method 700 allow, among other things, for additional weights to be added when a given pair of devices is identified in more than one network or more than one network type. This is useful, for example, because a given pair of devices may be regularly used in a home, workplace, or public network, even though the devices belong to separate users (for e.g., separate family members or coworkers). However, if a given pair of devices is both identified on a likely home network as well as a likely public network, for example, the likelihood that the devices are operated by the same user may increase substantially.

Figure 8:
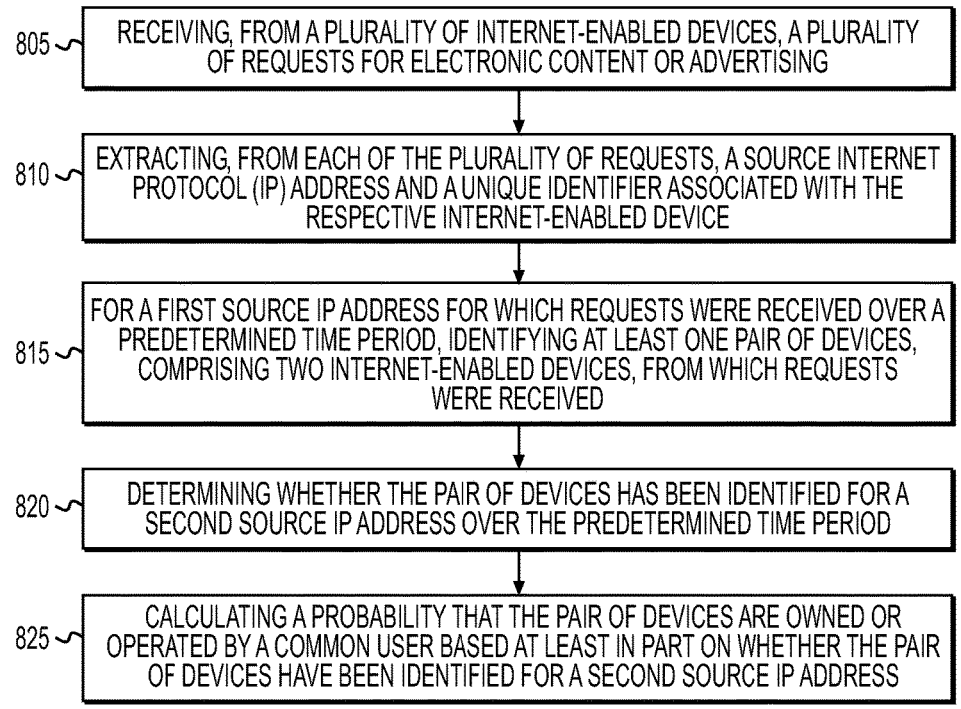
FIG. 8 is a flow diagram of a further exemplary method for performing Internet advertising techniques based on matching users and/or user advertising IDs across devices and browsers, according to an exemplary embodiment of the present disclosure.

FIG. 8 is a flow diagram of a method performed by user matching platform 306 for matching users across various Internet-enabled devices, and by user targeting platform 308 for performing online advertising based on users' identities for targeted and behavioral advertising, according to an exemplary embodiment of the present disclosure. Specifically, FIG. 8 depicts a method 800 for executing techniques between ad servers 152, user matching processor 154, and/or databases 156 of user matching server systems 150 to associate and/or advertise to users based on data collected across a plurality of devices they may use.

In one embodiment, method 800 may include receiving, from a plurality of Internet-enabled devices, a plurality of requests for electronic content or advertising (step 805). Method 800 may further include extracting, from each of the plurality of requests, a source internet protocol (IP) address and a unique identifier associated with the respective Internet-enabled device (step 810). Method 800 may further include, for a first source IP address for which requests were received over a predetermined time period, identifying at least one pair of devices, comprising two Internet-enabled devices, from which requests were received (step 815). At step 820, method 800 may further include determining whether the pair of devices has been identified for a second source IP address over the predetermined time period. At step 825, a probability may be calculated that the pair of devices are owned or operated by a common user based at least in part on whether the pair of devices have been identified for a second source IP address.

Figure 9:
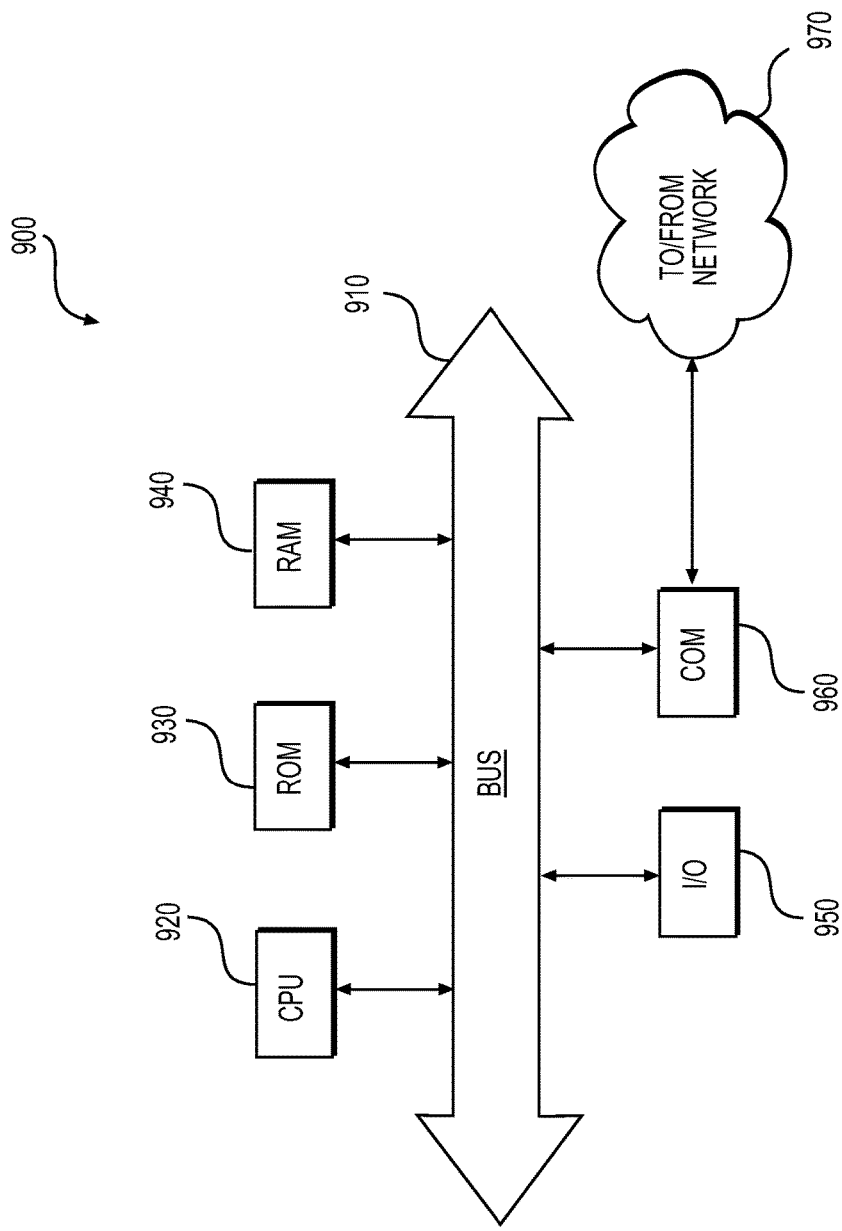
FIG. 9 is a simplified functional block diagram of a computer and/or server that may be configured as a device or system for performing Internet advertising techniques based on matching users and/or user advertising IDs across devices and browsers, according to an exemplary embodiment of the present disclosure.

FIG. 9 provides a functional block diagram illustration of general purpose computer hardware platforms. FIG. 9 illustrates a network or host computer platform 900, as may typically be used to implement a server, such as user matching processors 154, or any other server executing user matching platform 306. It is believed that those skilled in the art are familiar with the structure, programming and general operation of such computer equipment and as a result the drawings should be self-explanatory.

A platform for a server or the like 900, for example, may include a data communication interface for packet data communication 960. The platform may also include a central processing unit (CPU) 920, in the form of one or more processors, for executing program instructions. The platform typically includes an internal communication bus 910, program storage and data storage for various data files to be processed and/or communicated by the platform such as ROM 930 and RAM 940, although the server 900 often receives programming and data via network communications 970. The hardware elements, operating systems and programming languages of such equipment are conventional in nature, and it is presumed that those skilled in the art are adequately familiar therewith. The server 900 also may include input and output ports 950 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for associating a plurality of Internet-enabled devices with a common user profile, the method comprising:
    receiving, from a plurality of Internet-enabled devices, a plurality of requests for electronic content;
    extracting, from each of the plurality of requests, a source internet protocol (IP) address and a unique identifier associated with the respective Internet-enabled device;
    for a first source IP address for which requests were received over a predetermined time period, identifying at least one pair of devices, comprising two Internet-enabled devices, from which requests were received;
    determining whether the pair of devices has been identified for a second source IP address over the predetermined time period;
    calculating a confidence score based on a first likelihood that the pair of devices are owned or operated by a common user, wherein the confidence score is further based at least in part on whether the pair of devices has been identified for the first source IP address and for the second source IP address over the predetermined time period, wherein the first likelihood is based on determining, for each pair of devices, whether the pair of devices initiated a web event at the source IP address at a time period when users are statistically to be at home, wherein web events are weighted based on whether users are statistically likely to be away from home; and
    increasing the confidence score based on determining an increased likelihood that the pair of devices are owned or operated by the common user, wherein determining the increased likelihood is based at least in part on: (i) a number of times the pair of devices has been identified for the first source IP address and for the second source IP address over the predetermined time period, and (ii) a historic confidence score for the pair of devices, wherein the historic confidence score includes a lookback value that is configurable according to a division of prior time segments.

2. The method of claim 1, wherein the confidence score is calculated at least in part by incorporating at least one second likelihood that the pair of devices are owned or operated by a common user determined over a second predetermined time period.

3. The method of claim 2, further comprising:
    normalizing the first likelihood and the second likelihood;
    combining the first likelihood and the second likelihood to create a combined likelihood; and
    determining an overall likelihood that the pair of devices are owned or operated by a common user based at least in part on the combined likelihood.

4. The method of claim 1, wherein determining the first likelihood that the pair of devices are owned or operated by a common user further comprises:
    weighting web events that occur when users are statistically expected to be at home less heavily, than web events that occur at time periods when users are statistically likely to be away from home.

5. The method of claim 1, wherein determining the first likelihood that the pair of devices are owned or operated by a common user further comprises:
    weighting web events that occur when users are statistically expected to be at home more heavily, than web events that occur at time periods when users are statistically likely to be away from home.

6. The method of claim 1, further comprising:
    inferring, from each of the plurality of requests, a device type and local time associated with each request; and
    further determining the first likelihood that the pair of devices are owned or operated by a common user based on the inferred device type and local time associated with the request of each device.

7. The method of claim 1, further comprising:
    accessing, in a database, demographic or browsing history information generated from the common user's use of a first device of the pair of devices, the demographic or browsing history information being stored in the database in relation to the unique identifier; and
    identifying, based on the demographic or browsing history information, electronic content to display at a second device of the pair of devices, wherein the demographic or browsing history information is synchronized and associated with the common user's first device and the common user's second device.

8. A system for associating a plurality of Internet-enabled devices with a common user profile for targeting electronic content, the system including:
    a data storage device storing instructions for associating a plurality of Internet-enabled devices with a common user profile for targeting electronic content; and
    a processor configured to execute the instructions to perform a method including:
    receiving, from a plurality of Internet-enabled devices, a plurality of requests for electronic content;
    extracting, from each of the plurality of requests, a source internet protocol (IP) address and a unique identifier associated with the respective Internet-enabled device;
    for a first source IP address for which requests were received over a predetermined time period, identifying at least one pair of devices, comprising two Internet-enabled devices, from which requests were received;
    determining whether the pair of devices has been identified for a second source IP address over the predetermined time period;
    calculating a confidence scored based on determining a first likelihood that the pair of devices are owned or operated by a common user, wherein the confidence score is further based at least in part on whether the pair of devices has been identified for the first source IP address and for the second source IP address over the predetermined time period, wherein the first likelihood is based on determining, for each pair of devices, whether the pair of devices initiated a web event at the source IP address at a time period when users are statistically to be at home, wherein web events are weighted based on whether users are statistically likely to be away from home; and increasing the confidence score based on determining an increased likelihood that the pair of devices are owned or operated by the common user, wherein determining the increased likelihood is based at least in part on: (i) a number of times the pair of devices has been identified for the first source IP address and for the second source IP address over the predetermined time period, and (ii) a historic confidence score for the pair of devices, wherein the historic confidence score includes a lookback value that is configurable according to a division of prior time segments.

9. The system of claim 8, wherein the confidence score is calculated at least in part by incorporating at least one second likelihood that the pair of devices are owned or operated by a common user determined over a second predetermined time period.

10. The system of claim 9, wherein the processor is further configured for:
normalizing the first likelihood and the second likelihood;
combining the first likelihood and the second likelihood to create a combined likelihood; and
determining an overall likelihood that the pair of devices are owned or operated by a common user based at least in part on the combined likelihood.

11. The system of claim 8, wherein determining the first likelihood that the pair of devices are owned or operated by a common user further comprises:
weighting web events that occur when users are statistically expected to be at home less heavily than web events that occur at time periods when users are statistically likely to be away from home.

12. The system of claim 8, wherein determining the first likelihood that the pair of devices are owned or operated by a common user further comprises:
weighting web events that occur when users are statistically expected to be at home more heavily than web events that occur at time periods when users are statistically likely to be away from home.

13. The system of claim 8, wherein the processor is further configured for:
accessing, in a database, demographic or browsing history information generated from the common user's use of a first device of the pair of devices, the demographic or browsing history information being stored in the database in relation to the unique identifier; and
identifying, based on the demographic or browsing history information, electronic content to display at a second device of the pair of devices, wherein the demographic or browsing history information is synchronized and associated with the common user's first device and the common user's second device.

14. A non-transitory computer-readable medium storing instructions that, when executed by a processor, cause the processor to perform a method of associating a plurality of Internet-enabled devices with a common user profile for targeting electronic content, the method including:
receiving, from a plurality of Internet-enabled devices, a plurality of requests for electronic content;
extracting, from each of the plurality of requests, a source internet protocol (IP) address and a unique identifier associated with the respective Internet-enabled device;
for a first source IP address for which requests were received over a predetermined time period, identifying at least one pair of devices, comprising two Internet-enabled devices, from which requests were received;
determining whether the pair of devices has been identified for a second source IP address over the predetermined time period;
calculating a confidence score based on determining a first likelihood that the pair of devices are owned or operated by a common user, wherein the confidence score is further based at least in part on whether the pair of devices has been identified for the first source IP address and for the second source IP address over the predetermined time period, wherein the first likelihood is based on determining, for each pair of devices, whether the pair of devices initiated a web event at the source IP address at a time period when users are statistically to be at home, wherein web events are weighted based on whether users are statistically likely to be away from home; and
increasing the confidence score based on determining an increased likelihood that the pair of devices are owned or operated by the common user, wherein determining the increased likelihood is based at least in part on: (i) a number of times the pair of devices has been identified for the first source IP address and for the second source IP address over the predetermined time period, and (ii) a historic confidence score for the pair of devices, wherein the historic confidence score includes a lookback value that is configurable according to a division of prior time segments.

15. The non-transitory computer-readable medium of claim 14, wherein the confidence score is calculated at least in part by incorporating at least one second likelihood that the pair of devices are owned or operated by a common user determined over a second predetermined time period.

16. The non-transitory computer-readable medium of claim 15, the method further including:
normalizing the first likelihood and the second likelihood;
combining the first likelihood and the second likelihood to create a combined likelihood; and
determining an overall likelihood that the pair of devices are owned or operated by a common user based at least in part on the combined likelihood.

17. The non-transitory computer-readable medium of claim 14, wherein the method of determining the first likelihood that the pair of devices are owned or operated by a common user further includes:
weighting web events that occur when users are statistically expected to be at home less heavily than web events that occur at time periods when users are statistically likely to be away from home.

* * * * *